United States Patent
Grace et al.

(10) Patent No.: US 11,633,681 B2
(45) Date of Patent: Apr. 25, 2023

(54) REPLACEABLE FILTER PLATE ASSEMBLY FOR A ROTARY DRUM FILTER

(71) Applicant: Andritz Inc., Alpharetta, GA (US)

(72) Inventors: Todd Grace, Alpharetta, GA (US); Kent Stubblefield, Alpharetta, GA (US)

(73) Assignee: ANDRITZ INC., Alpharetta, GA (US)

( * ) Notice: Subject to any disclaimer, the term of this patent is extended or adjusted under 35 U.S.C. 154(b) by 443 days.

(21) Appl. No.: 16/775,744

(22) Filed: Jan. 29, 2020

(65) Prior Publication Data

US 2020/0246733 A1 Aug. 6, 2020

Related U.S. Application Data

(60) Provisional application No. 62/801,092, filed on Feb. 5, 2019.

(51) Int. Cl.
B01D 35/02 (2006.01)

(52) U.S. Cl.
CPC ........ B01D 35/02 (2013.01); *B01D 2265/028* (2013.01)

(58) Field of Classification Search
CPC .............. B01D 35/02; B01D 2265/028; B01D 33/067; B01D 33/09
USPC ........... 55/497; 210/784, 791, 402, 232, 404
See application file for complete search history.

(56) References Cited

U.S. PATENT DOCUMENTS

| | | | |
|---|---|---|---|
| 3,175,691 A * | 3/1965 | Watson | B01D 33/067 210/404 |
| 3,363,774 A | 1/1968 | Luthi | |
| 3,386,584 A | 6/1968 | Luthi | |
| 3,794,178 A | 2/1974 | Luthi | |
| 3,837,499 A * | 9/1974 | Luthi | B01D 33/09 210/404 |
| 4,906,364 A | 3/1990 | Luthi et al. | |
| 5,244,572 A | 9/1993 | McAllister | |
| 5,281,343 A | 1/1994 | Lewis et al. | |
| 5,308,488 A | 5/1994 | Nelson | |
| 5,480,545 A | 1/1996 | Lewis | |

(Continued)

FOREIGN PATENT DOCUMENTS

CA 2135728 5/1995

OTHER PUBLICATIONS

Canadian Application No. CA3084933, Notice of Allowance dated Jun. 18, 2021, 1 page.

(Continued)

*Primary Examiner* — Robert A Hopkins
*Assistant Examiner* — Qianping He
(74) *Attorney, Agent, or Firm* — Kilpatrick Townsend & Stockton LLP

(57) ABSTRACT

A removable filter plate for a rotary drum filter that reduces instances of welding to secure the filter plate to the drum and obviates the need for cap strips. An exemplary filter plate assembly in accordance with this disclosure comprises a filter plate and an engagement assembly, wherein the engager of the engagement assembly is configured to extend in a lateral direction toward the leading end or the trailing end of the filter plate, wherein an extended engager having an engagement end disposed under a shelf of the adjacent top hat mounting assembly defines a closed position, and wherein a retracted engager defines an open position.

12 Claims, 16 Drawing Sheets

(56) References Cited

U.S. PATENT DOCUMENTS

| | | | |
|---|---|---|---|
| 5,871,643 | A | 2/1999 | Ota |
| 7,347,916 | B2 | 3/2008 | Grace |
| 7,575,658 | B2 | 8/2009 | Grace |
| 9,669,337 | B2 | 6/2017 | Giasson |
| 2005/0002363 | A1 | 1/2005 | Cheng et al. |
| 2007/0000126 | A1 | 1/2007 | Na |
| 2008/0015674 | A1 | 1/2008 | Austin et al. |
| 2008/0257506 | A1 | 10/2008 | Grace et al. |
| 2016/0263501 | A1* | 9/2016 | Giasson ............... B01D 33/067 |
| 2016/0280045 | A1 | 9/2016 | Nefzer et al. |
| 2017/0252684 | A1 | 9/2017 | Goedecke et al. |
| 2018/0126317 | A1 | 5/2018 | Nepsund et al. |

OTHER PUBLICATIONS

Canadian Application No. 3084933, Office Action dated Jan. 19, 2021, 3 pages.

International Application No. PCT/US2020/016060, International Preliminary Report on Patentability, dated Aug. 19, 2021, 9 pages.

McCarthy, James; Canadian Office Action dated Aug. 24, 2020, pp. 1-5.

Thomas, Shane, International Search Report and Written Opinion, and Examiner Search Strategy, dated Apr. 23, 2020, pp. 1-18, ISA/USA, Alexandria, Virginia, USA.

* cited by examiner

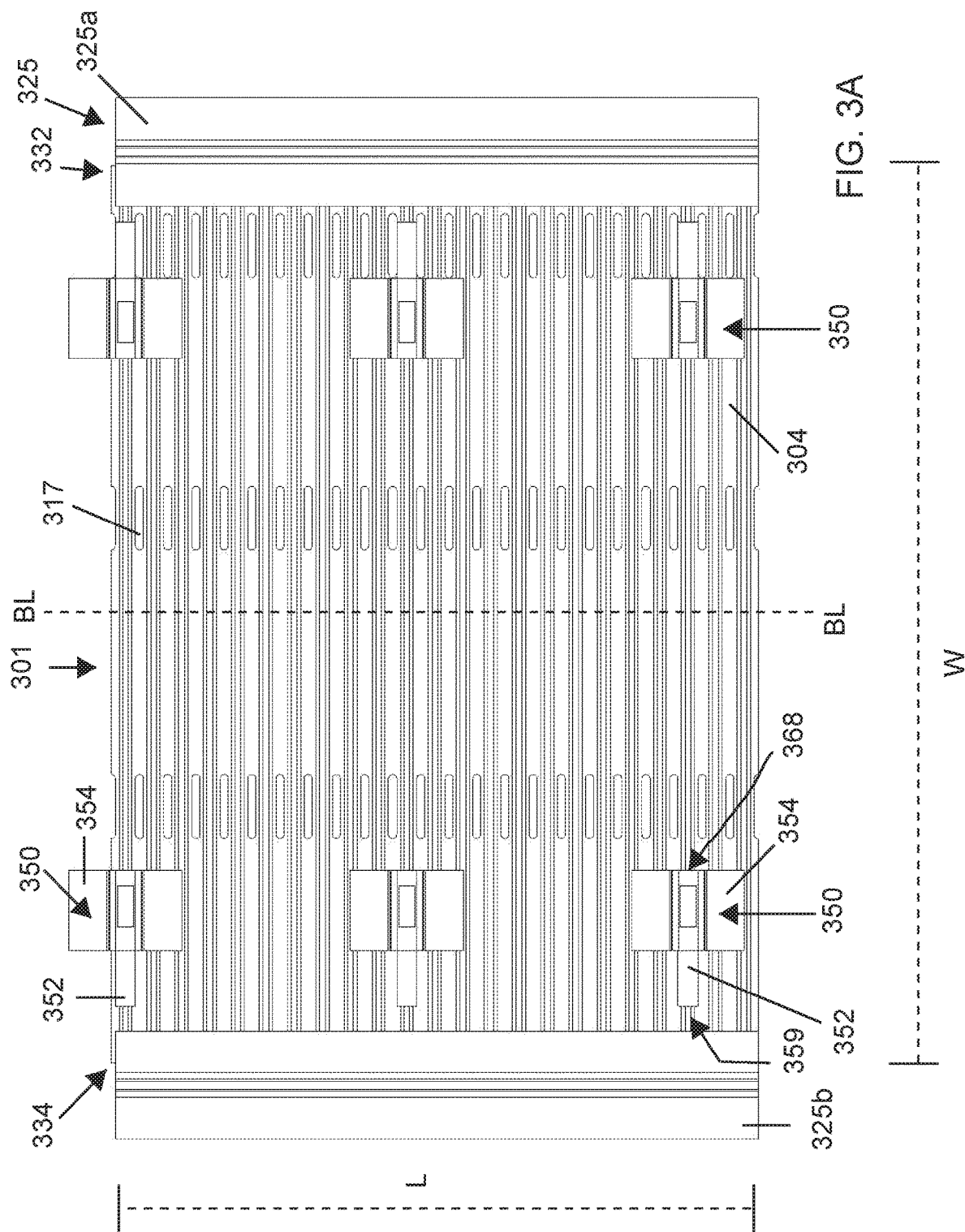

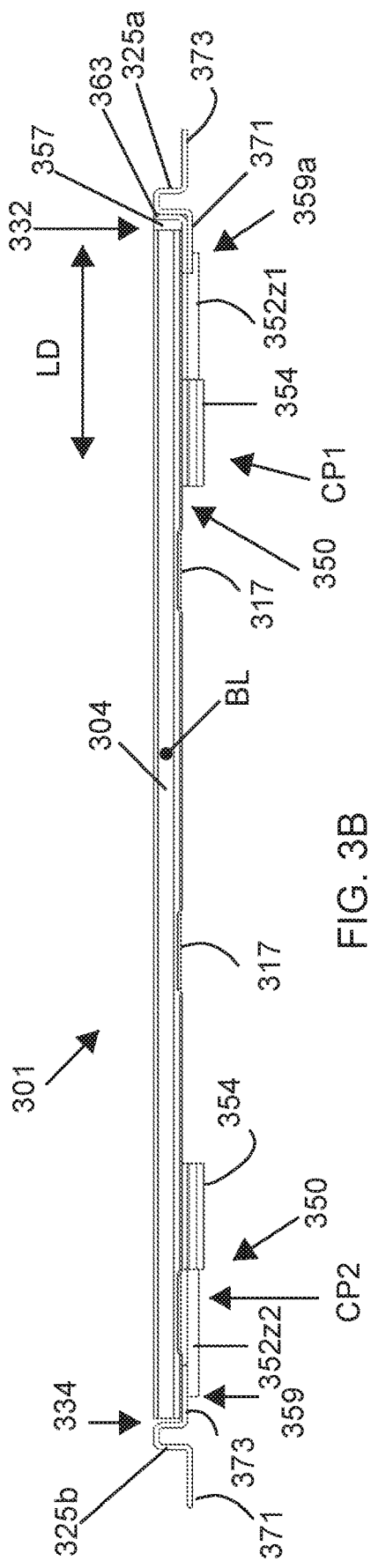
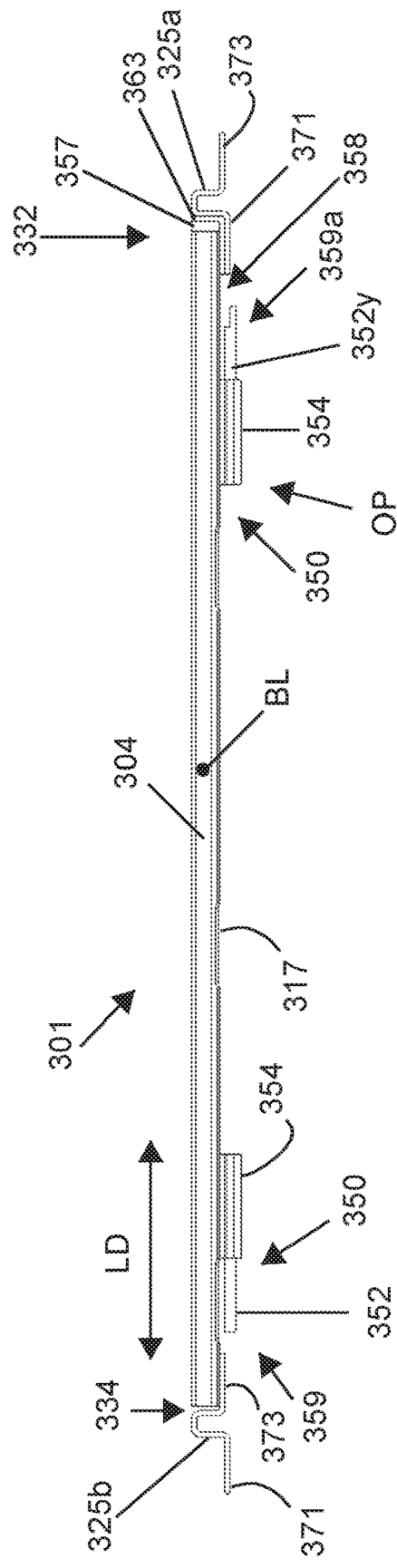
FIG. 3B
FIG. 3C

REPLACEABLE FILTER PLATE ASSEMBLY FOR A ROTARY DRUM FILTER

CROSS-RELATED APPLICATION

This application claims the benefit under 35 U.S.C. § 119(e) of the earlier filing date of U.S. Provisional Patent Application No. 62/801,092 filed on Feb. 5, 2019, the entire contents of which is incorporated herein by reference.

BACKGROUND OF THE INVENTION

Technical Field

The present disclosure relates generally to rotary drum filters configured to filter slurries and more particularly to filter plates in rotary vacuum drum washers, thickeners, and filters used in the pulp and paper, chemical recovery, waste separation, and mining industries.

Related Art

Several industries utilize rotary drum filters to separate filtrate from residue on an industrial scale. A typical rotary drum filter generally comprises a cylindrical drum mounted lengthwise for rotation in a tank or vat. Operators fill the vat with a slurry. The cylindrical drum comprises several divisions (i.e. cylindrical sectors) arrayed around the rotational axis. These divisions' radially outward surfaces define a filter deck assembly. The filter deck assemblies in turn comprise the outer surface of the drum. In practice, operators maintain a pressure differential between the inside and the outside of the drum. That is, the drum's interior generally exists at sub-atmospheric pressure. As a given filter deck assembly on a given division rotates through the slurry, the pressure differential pulls filtrate through the filter deck assembly. This in turn allows residue to accumulate on the filter deck assembly's outer surface. This accumulated residue may be a "pulp mat," a sediment "cake," or it may be referred to by other names depending upon the slurry that the rotary drum filter separates. When a division rotates above the slurry level, the pressure differential continues to pull entrapped liquid from the accumulated residue through the filter deck assembly and thereby begins to dry the accumulated residue.

The filtrate flows through the filter deck assembly toward the rotational axis. The filtrate then flows out of a supportive trunnion into a drop leg. The filtrate flowing down through the drop leg is the primary source of the pressure differential (i.e. it creates the vacuum pressure). A stationary arced valve also sits in the trunnion upstream of the drop leg. The arced valve has a first end positioned at roughly the 12 o'clock position (i.e. the apex of rotation when the rotary drum filter is operational) and a second end positioned between roughly the 3 o'clock position (i.e. halfway along a given division's downward rotational journey) and the 5 o'clock position (i.e. about 30 degrees upstream of the nadir of rotation). As a filter deck assembly of a given division rotates past the apex and over the arced valve, the arced valve blocks the underside of the filter deck assembly from fluidly communicating with the drum interior and the drop leg, thereby equalizing pressure (i.e. releasing vacuum pressure) at the outer surface of the filter deck assembly.

A doctor blade, roller, belt, or other extracting apparatus then removes the accumulated residue from the filter deck assembly on the now pressure-equalized division. Typically, additional equipment then collects this residue for further processing. The now cleaned filter deck assembly continues to rotate downward toward the slurry. As the division rotates past the end of the valve, the pressure differential returns, thereby permitting the process to repeat as the division rotates through the slurry.

While the rotary drum filter design endures, the traditional design of the filter deck assembly contributes to problems that can lead to production loss. Traditional filter deck assemblies comprise corrugated filter plates. Each filter plate spans one or more grid supports. The respective filter plate ends engage a hat-shaped mounting clip that is in turn mounted on a grid support. Installers and servicers weld at least one end of the filter plate to a mounting clip to prevent filtrate from leaking back into the vat when the filter plate rotates downwardly. These "top hat" mounting clips also have a cap strip welded on top of (i.e. radially outward of) each mounting clip to define a generally C-shaped recess. Each end of the filter plate rests in one of these C-shaped recesses. Installers and servicers spot weld or tungsten inert gas ("T.I.G.") weld these cap strips to the mounting clips. Installers and servicers may also weld the ends of the filter plate to the mounting clip and/or cap strip to form a secure seal and fixedly install the filter plates. The filter plates, mounting clips, and cap strips, are typically all manufactured from stainless steel.

In practice, and depending upon the application, the temperature profile of the cylindrical drum may vary significantly, at least at startup. For example, if a rotary drum filter is used to dewater a pulp slurry, the starting temperature of the pulp slurry may be in a range of 180 degrees Fahrenheit (° F.) to 200° F. in a first stage vat. The filtered pulp generally cools to about 140° F. by the time the pulp is removed from the drum. Likewise, the drum divisions that start in the vat will typically have a higher average temperature than the divisions that start above the vat. As the pulp mat rotates out of the vat, washers may spray the mat with water or other fluid to displace the entrapped slurry liquid. The expansion and contraction of the stainless steel in response to temperature fluctuations can stress the deck assembly welds, particularly the welds engaging the filter plates, mounting clips, and cap strips. Even though rotation and the materials of the cylindrical drum may eventually reduce the temperature differential over time, any remaining differential will still stress the welds. Furthermore, the cyclical loading and negative pressurization of the filter plates and unloading and depressurization of the filter plates also contributes to stressing and eventual failure of the welds. If left unaddressed, excessive or prolonged periods of stress will lead to weld failure. Weld failure between adjacent filter plates permits filtrate to flow back out of the filter deck assembly and into the vat, thereby reducing the drum filter's efficiency.

Deactivating the rotary drum filter to fix these problems results in production loss. Removing the welds to repair or rebuild the rotary drum filter can be time consuming and costly. The time and monetary cost motivates some mill operators to delay shutdowns until there is a risk of imminent equipment failure. This practice results in reduced equipment production as the problems continue to develop and efficiency continues to degrade. Furthermore, it takes more time to repair or rebuild a severely damaged rotary drum filter, thereby further exacerbating production loss.

Previously, others attempted to improve installation time with the design described in U.S. Pat. No. 9,669,337 to Giasson (hereinafter, "Giasson"). This design requires welding, gluing, or otherwise affixing the "top hat" mounting clips to the support grids and having a "snap in" cap strip.

However, the "snap in" cap strip comprises a U-shaped piece and a generally planar top piece (i.e. a traditional cap strip) that is welded, glued, or otherwise fixedly engaged to the U-shaped piece. Furthermore, after installation, Giasson recommends welding or otherwise permanently engaging the removable cap strip into place. The presence of welds to secure: the mounting clips to the support grids, the components of the cap strip to one another, and optionally, the cap strip to the mounting clip, does nothing to address the problem of weld failure in the filter deck assembly.

SUMMARY OF THE INVENTION

The problem of production loss and risk of injury to nearby operating personnel due to weld fatigue in welds between filter plates and mounting clips in a filter plate assembly of a rotary drum filter is mitigated by the use of a removable filter plate for a rotary drum filter comprising: a filter plate; an engagement mechanism engaged to the filter plate, the engagement mechanism having an open position and a locked position, wherein the locked position is configured to engage the filter plate to the rotary drum filter.

In an exemplary embodiment, a replaceable filter deck assembly for a rotary drum filter comprises: a filter plate having a leading end distally disposed from a trailing end, and an axial filter plate bisection line extending through the filter plate; an engagement assembly engaged to the filter plate, the engagement assembly comprising: an engager, and an engager holder supporting the engager, wherein the engager is configured to extend in a lateral direction beyond the leading end or the trailing end of the filter plate, wherein an extended engager defines a closed position, and wherein the engager is configured to retract in the lateral direction toward the axial filter plate bisection line, and wherein a retracted engager defines an open position.

In other exemplary embodiments, the engager may be configured to move in an axial direction, wherein the engager disposed at a first axial location defines a closed position, and wherein the engager disposed at a second axial location defines an open position. In still other exemplary embodiments, the engager may be configured to move in both a lateral and an axial direction.

It is contemplated that an advantage of the present disclosure is that a filter plate assembly in accordance with the embodiments herein will allow installers and servicers to install replacement filter plates by dropping replacement filter plates into place without having to remove cap strips or other securing mechanisms that hinder installation. As a result, replaceable filter deck assemblies in accordance with this disclosure may contribute to a reduction in down time.

Another advantage of the present disclosures is that there is no longer a need for cap strips, thereby reducing the overall welds in the filter deck assembly and potentially extending the assembly's useful life.

Another potential advantage of certain exemplary embodiments is that the mounting clips can also be eliminated. In such weld-less embodiments, it is contemplated that the need to replace filter deck assemblies due to chlorine-induced corrosion will be obviated.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating the disclosed embodiments.

FIG. 3A is a bottom-up view of an exemplary removable filter plate assembly in accordance with the present disclosure.

FIG. 3B is a side view of the exemplary removable filter plate assembly of FIG. 3A showing an engagement assembly in the closed position.

FIG. 3C is a side view of the exemplary removable filter plate assembly of FIG. 3A showing an engagement assembly in the open position.

DETAILED DESCRIPTION OF THE INVENTION

Figure 1:
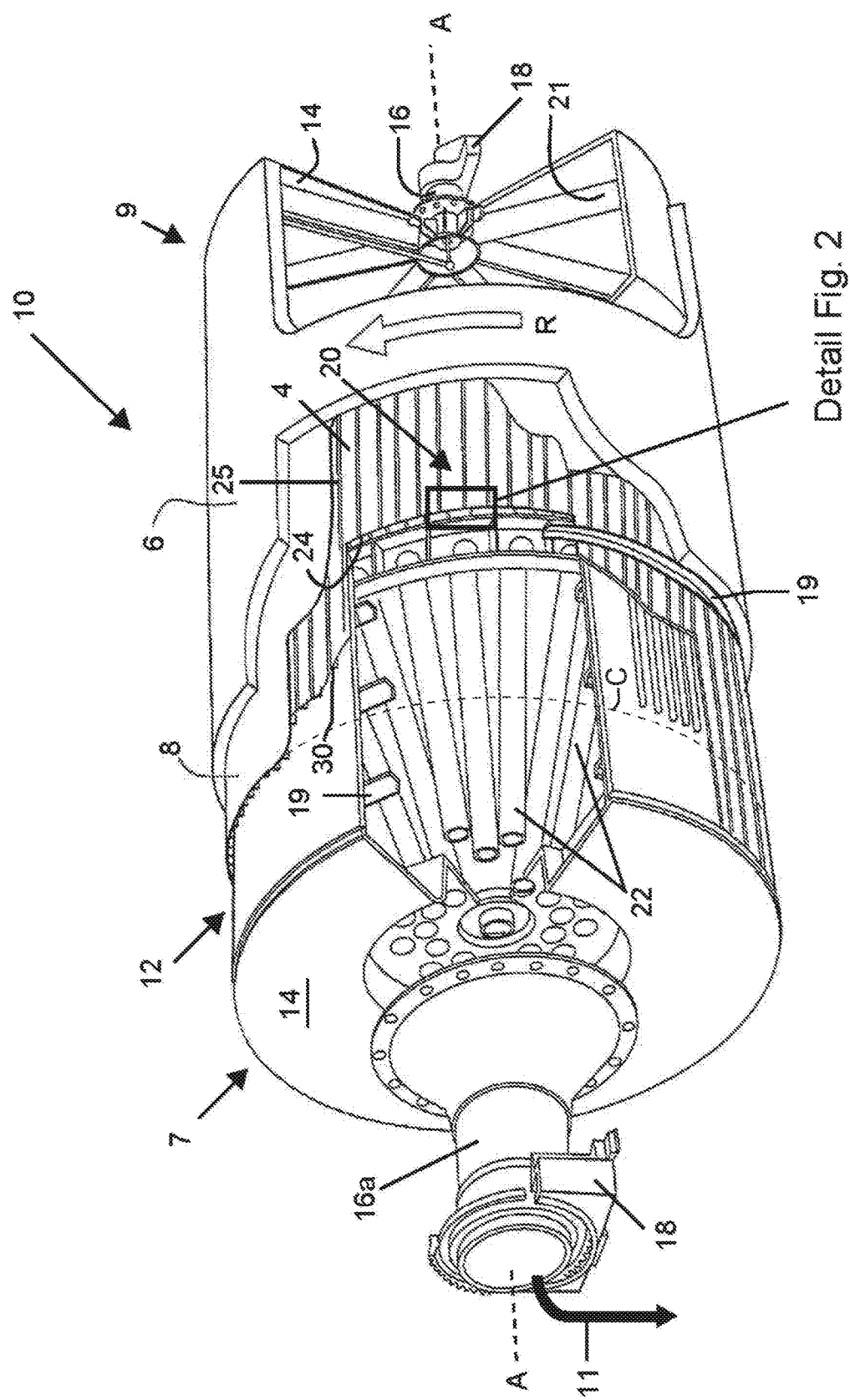
FIG. 1 is a perspective view of a rotary drum filter, in particular, a vacuum washer used in the pulp and paper industry.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Corresponding reference characters indicate corresponding parts throughout the several views. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although specific terms are used in the following description for the sake of clarity, these terms are intended to refer only to the particular structure of the embodiment selected for illustration in the drawings, and are not intended to define or limit the scope of the disclosure.

The singular forms "a," "an," and "the" include plural referents unless the context clearly dictates otherwise. Numerical values should be understood to include numerical values which are the same when reduced to the same number of significant figures and numerical values which differ from the states value by less than the experimental error of conventional measurement technique of the type described in the present application to determine the value.

All ranges disclosed herein are inclusive of the recited endpoint and are independently combinable (for example, the range "from 2 grams to 10 grams" is inclusive of the endpoints, 2 grams and 10 grams, and all intermediate values.

As used herein, approximating language may be applied to modify any quantitative representation that may vary without resulting in a change in the basic function to which it is related. Accordingly, a value modified by a term or terms, such as "about" and "substantially," may not be limited to the precise values specified. The modifier "about" should also be considered as disclosing the range defined by the absolute values of the two endpoints. For example, the expression "from about 212° F. to about 1,300° F." also discloses the range "from 212° F. to 1,300° F."

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow of fluids through an upstream component prior to flowing through the downstream component.

The terms "horizontal" and "vertical" are used to indicate direction relative to an absolute reference, i.e. ground level. However, these terms should not be construed to require structure to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference; an upwards flow is always against the gravity of the Earth.

The term "directly," wherein used to refer to two system components, such as valves or pumps, or other control devices, or sensors (e.g. temperature or pressure), may be located in the path between the two named components.

FIG. 1 depicts a typical rotary drum filter 10. Although designs vary slightly, a typical rotary drum filter 10 comprises a cylindrical drum 12 disposed lengthwise in a vat (not depicted). Closure plates 14 bound each end 7, 9 of the drum 12. Support ribs 21 extend generally radially outward from structures surrounding the axis of rotation A toward the drum's outer circumference C. Multiple ring supports 19 support the filter deck assembly 20 (detailed in FIG. 2). A trunnion 16 extends from each end 7, 9 of the drum 12 and rotatably mounts the drum 12 to adjacent bearing and pedestal assemblies 18. One of the trunnions 16a is hollow and connects to a drop leg (not depicted). During operation, the drop leg pulls air through the drum 12 and thereby draws filtrate 11 (see also FIG. 2) through the rotary drum filter 10 under vacuum. A number of filtrate conduits 22 disposed between the hollow trunnion 16a and the filtrate chambers 24 (see also FIG. 2) allow filtrate 11 to fluidly communicate with the drop leg.

A screen 8, typically a wire mesh (typically known as a "face wire"), cloth, synthetic textile, or plastic screen encircles the drum 12. In operation, the vat is filled with a slurry. In FIG. 1, the drum 12 rotates in rotational direction R, which in this example, is counter-clockwise. As divisions of the drum 12 rotate through the vat, the pressure differential (i.e. the vacuum pressure) facilitates the accumulation of residue 6 on the screen 8. As the drum division continues to rotate above the slurry level, filtrate 11 percolates through the filter deck assembly 20 and eventually flows through the filtrate conduits 22 into the drop leg. A the drum 12 continues to rotate, the residue 6 begins to dry and a doctor blade, belt, roller, or other device eventually scrapes the residue 6 from the screen 8 before that section of the screen 8 rotates back under the slurry to repeat the process.

When the rotary drum filter 10 is a vacuum washer used in the pulp and paper industry, the slurry is a typically a mixture of pulp and water called a "pulp stock." The residue 6 on the screen are typically known as a "pulp mat." In mineral processing, the rotary drum filter 10 may be known as a thickener. The residue 6 is typically cakes of mineral sediment. For example, lime mud filters are typically used to recover lime from spent pulp and paper liquors. In a lime mud filter, the filtrate 11 typically comprises water and the residue 6 comprises lime mud.

Figure 2:
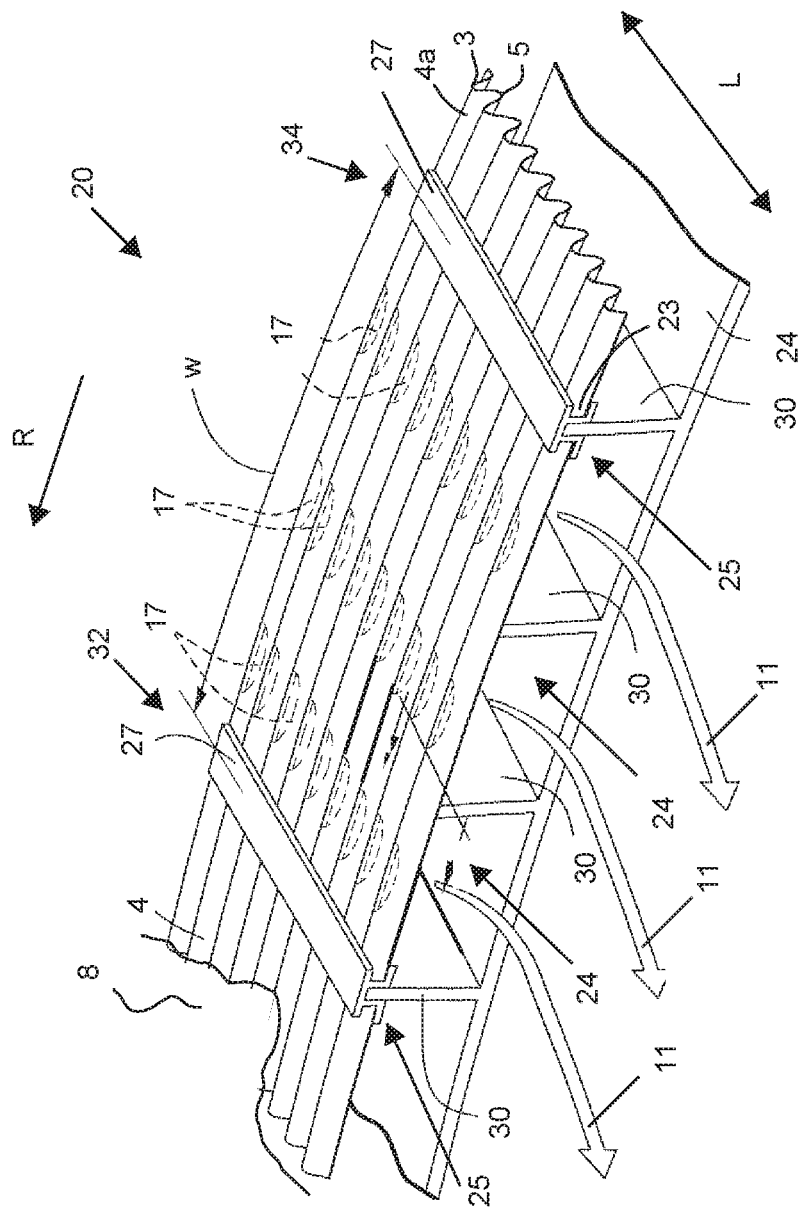
FIG. 2 is a detailed perspective view of a portion of the deck assembly of FIG. 1.

FIG. 2 is a detailed view of a portion of a filter deck assembly 20 of FIG. 1. The screen 8 rests atop an array of filter plates 4. The filter plates 4 are typically corrugated filter plates 4a having a plurality of ridges 3 and channels 5. Corrugated filter plates 4a are generally preferred because the corrugations increase the surface area available for holding excess filtrate 11 and thereby permit the rotary drum filter 10 to rotate at higher speeds than would typically be achievable in an identical rotary drum filter 10 having a comparatively flat filter plate (i.e. a filter plate that curves slightly to match the arc of the drum 12, but that is otherwise flat). Furthermore, the corrugations easily expand and contract slightly to accommodate thermal expansion. Each filter plate 4 has a width W and a length L. The filter plate 4 has areas defining multiple drainage slots 17 disposed throughout the filter plate 4. When the filter plate 4 is a corrugated filter plate 4a, the multiple drainage slots 17 are typically disposed in the channels 5. The drainage slots 17 may be louvered to collect pools of filtrate 11 on the downturn.

The filter plate 4 spans one or more grid supports 30. Adjacent grid supports 30 and the filter plate 4 define one or more filtrate chambers 24. In operation, filtrate 11 flows through the screen 8 and through the drainage slots 17 on the upturn and part of the downturn. The filtrate 11 then flows through the filtrate chambers 24 before flowing further to the filtrate conduits 22 (FIG. 1) and drop leg.

The filter plate 4 further comprises a leading end 32 and a trailing end 34. The leading end 32 is the end that first exits the slurry when the particular section of the filter plate 4 is moving upward toward the apex of rotation and the leading end 32 is likewise the first end to fall back under the level of the slurry when the section of the filter plate 4 is moving downward toward the nadir of rotation. Similarly, the trailing end 34 is distally disposed from the leading end 32. The trailing end 34 is the second end to exit the slurry when the filter plate 4 is moving toward the apex of rotation. It will be understood that if an operator reverses the direction of rotation, the "leading ends" and the "trailing ends" designations will likewise reverse.

The respective ends 32, 34 of the filter plates 4 engage a hat-shaped mounting clip 25 mounted on a grid support 30. In the past, installers and servicers have welded or otherwise rigidly affixed at least one end 32 or 34 of the filter plate 4 to a mounting clip 25 to prevent filtrate 11 from leaking around leading end 32 and back out of the filter plate 4 when the filter plate 4 is on the downturn. The "top hat" mounting clips 25 also have a cap strip 27 welded or otherwise rigidly affixed to each mounting clip 25. In practice, installers and servicers spot weld or T.I.G. weld these cap strips 27 to the mounting clips 25. The recess 23 (i.e. the generally C-shaped feature) created by the body of the mounting clip 25, a mounting clip shelf (see 371, 373 (FIG. 3B), and the cap strip 27, also secures the ends 32, 34 of the filter plates 4 to the drum 12. By welding the ends 32, 34 to the mounting clip 25, installers and operators sought to further prevent filtrate 11 from leaking around leading end 32 and back out of the filter plate 4 when the filter plate 4 is on the downturn and to ensure that the filter plate 4 was secured to the drum 12. Preventing the filtrate from flowing back out of the filter plate 4 permitted operators to operate the rotary drum filter 10 at higher rotational velocities and thereby increase the separation rate and the residue yield over time.

Furthermore, processes that expose the welds to electronegative ions can also weaken the welds over time. For example, in bleach plants, the chlorine in bleach will attack the protective oxide layer on the stainless steel, and then attack the stainless steel itself. Because substantially all structural components of the cylindrical drum 12 are manufactured from stainless steel, all the steel in the drum 12 will be attacked. Unlike rust, chloride-induced corrosion is not bulk corrosion, that is, once the chlorine wears through the protective oxide layer, the chlorine will concentrate in that area and continue to corrode the exposed steel. The induced stresses from welding, combined with built-in mechanical stresses from manufacturing, operation (e.g. cyclical loading and unloading of residue, uneven load distribution of the residue, and cyclical pressurization and depressurization of the filter plates), and thermal cycling, make welds in particular a weakened initiation point for the corrosion. Once the corrosion starts, the reactive chloride ions tend to concentrate in these areas, thereby accelerating further corrosion. As a result, these welds create a greater potential for loose cap strips 27 and filter plates 4, torn or otherwise damaged screens 8, and doctor blades, rollers, belts, or other extracting apparatuses damaged from encountering the loose cap strips 27.

In practice, Applicant has discovered that the rigidly affixed cap strips 27 create ongoing maintenance problems. The rigidly affixed cap strip 27 prevent a servicer from easily accessing and removing or replacing the filter plate 4. Additionally, if the cap strips 27 have been welded to the mounting clips 25, the environment within the rotary drum filter 10 can lead to weld fatigue and corrosion. In extreme cases, broken welds create loose cap strips 27 and filter plates 4, which can damage the doctor blades, rollers, belts, or other devices configured to remove the residue 6 from the screen 8. The loose cap strips 27 or filter plates 4 can likewise tear or otherwise damage the screen 8. This permits filtrate 11 to flow both between drum divisions and back out of filter plate 4 and screen 8, thereby reducing the overall efficiency of the system.

Rotary drum filters 10 typically operate as a closed system that is part of a much larger production operation. Tracing a yield or quality reduction to loose cap strips 27, filter plates 4, or damaged residue extraction devices is often time intensive, is not always readily apparent given the complexities and variables of the overall production process, and is often based upon measurements taken downstream of the rotary drum filter 10. As such, even when measurements are taken, the data is typically desynchronized from current conditions inside the rotary drum filter 10. As such, realization of any further degradation is likewise delayed. Furthermore, even if operators do suspect minor problems with the rotary drum filter 10, operators concerned with production yields are often reluctant to interrupt the process, or divert the flow a slurry to another rotary drum filter 10 and reduce overall production capacity, to deactivate the problem rotary drum filter 10 to investigate. As such, minor initial problems with welds tend to progress to large problems with loose cap strips 27, loose filter plates 4, torn screens 8, and damaged residue extraction devices before the entire system is stopped for annual or biannual maintenance. By this time, the more damaged rotary drum filter 10 can take longer to repair, thus extending overall plant shutdowns and overall reductions in aggregate product yields.

To address these problems, Applicant presents several exemplary embodiments, combinations of which are all considered to be within the scope of in this disclosure. FIG. 3A depicts bottom-up view of an exemplary removable filter plate assembly 301 for a rotary drum filter 10 (FIG. 1) comprising: a filter plate 304 having a leading end 332 distally disposed from a trailing end 334, and an axial bisection line BL extending through the filter plate 304. The removable filter plate assembly 301 further comprises multiple drainage slots 317 disposed along the width W and length L of the filter plate 304. An engagement assembly 350 is affixed to the filter plate 304. In the depicted embodiment, the engagement assembly 350 is affixed to the bottom of the filter plate 304. The engagement assembly 350 comprises: an engager 352, and an engager holder 354 supporting the engager 352. The engager 352 is configured to extend in a lateral direction LD (FIG. 3B) toward the leading end 332 (see the engagement assemblies 350 disposed closer to the leading end 332 than the bisection line BL) or the trailing end 334 (see the engagement assemblies 350 disposed closer to the trailing end 334 than the bisection line BL) of the filter plate 304. In this manner, an extended engager 352z (FIG. 3B) defines a closed position CP (FIG. 3B). The engager 352 is further configured to retract in the lateral direction LD toward the axial bisection line BL. The retracted engager 352y defines an open position OP (FIG. 3C). FIG. 3A further depicts the respective ends 332, 334 resting atop respective shelfs 371, 373 (FIG. 3B) of distally disposed mounting clips 325. A first mounting clip 325a is adjacently disposed to the leading end 332 of the filter plate 304. A second mounting clip 325b is adjacently disposed to the trailing end 334 of the filter plate 304. In this depiction, the engagement end 359 of the engager 352 is retracted and in the open position OP.

It will be understood that an exemplary engager 352 configured to move in a lateral direction LD may also be configured to move in an axial direction, radial direction, rotational direction, or a combination thereof.

As shown in FIGS. 3A-3C, the engager 352 extends under an adjacent mounting clip 325a or 325b to secure the removable filter plate assembly 301 to the drum 12 (FIG. 1). In the exemplary embodiment, the engagement assemblies 350 near the trailing end 334 have an engager 352 that has an engagement end 359 disposed entirely under the mounting clip 325 in the closed position CP. Likewise, the engagement assemblies 350 near the leading end 332 have an engager 352 that has an engagement end 359a disposed entirely under the mounting clip 325a in the closed position CP. In this manner, the exemplary removable filter plate assembly 301 can be fixedly engaged to the respective adjacent mounting clips 325a, 325b without the use of a cap strip 27. As such, the exemplary removable filter plate assembly 301 can be affixed to respective adjacent mounting clips 325a, 325b without the need for welding either the leading end 332 or the trailing end 334 of the filter plate 304 to a cap strip 27, thereby reducing the overall number of welds in the rotary drum filter 10. It is contemplated that the overall reduction in the number of welds affixing the exemplary removable filter plate assembly 301 to the rotary drum filter 10 reduces the problems associated with weld fatigue. It is further contemplated that the overall reduction in the number of welds permitted by the exemplary removable filter plate assembly 301 can also facilitate faster removable and replacement of worn removable filter plate assemblies 301, thereby contributing to an overall reduction in operational downtime during maintenance periods. It is additionally contemplated that the increased rate at which worn removable filter plate assemblies 301 can be removed and replaced may persuade operators to deactivate damaged rotary drum filters 10 more frequently in exchange for reduced downtime, faster return to optimum rotary drum filter production, and possible increased aggregate product yield attributable to more rotary drum filters 10 operating at peak production efficiency for longer periods of time than was previously possible.

As better seen in FIGS. 3B and 3C, the exemplary filter plate assemblies 301 described herein may further comprise a plug seal 357 disposed at the leading end 322 of the filter plate 304. The plug seal 357 prevents filtrate 11 from flowing around the leading end 322 of the filter plate 304 when the filter plate 304 rotates downwardly toward the nadir. An L-shaped seal retainer 363 may be disposed between the plug seal 357 and the adjacent mounting clip 325 to secure the seal.

In the depicted embodiment, each mounting clip 325 has as first shelf 371 that is disposed slightly lower than the adjacent second shelf 373 on the same mounting clip 325. The lower first shelf 371 accommodates the seal 357 and the L-shaped seal retainer 363 that are disposed at the leading end 332 of the filter deck 304. To accommodate the lower first shelf 371, the engagement assembly 350 disposed closer to the leading end 322 has a notch 358 (FIG. 3C) in the engagement end 359a. The notch 358 allows an upper portion of the engager 352 to rest against a side of the adjacent mounting clip 325 (i.e. the side of the lower first shelf 371) and any L-shaped seal retainer 363. The lower end of the notched engagement end 359a is disposed under the adjacent mounting clip 325 in the closed position CP1. In this manner, the engagement assembly 350 disposed closer to the leading end 332 (compared to an engagement assembly 350 disposed closer to the trailing end 334) secures the leading end 332 of the filter plate 304 to the mounting clip 325 while further securing the L-shaped seal retainer 363 between the first shelf 371 of the mounting clip 325 and the leading end 332. The plug seal 357 occupies a space between the L-shaped seal retainer 363 and the leading end 332. As the leading end 332 rotates downwardly, the mass of the filter plate 304 exerts a force on the plug seal 357 to press the plug seal 357 against the L-shaped seal retainer 363 to thereby prevent filtrate 11 from flowing around the leading end 332 of the filter plate 304 and back out into the vat.

Engagement assemblies 350 in accordance with this disclosure allow installers and servicers to use a removable filter plate assembly 301 with existing mounting clips 325. Furthermore, when the respective engagers 352 are in the closed and/or locked positions, the removable filter plate assembly 301 is securely engaged to the existing mounting clips 325 without the need for welds. The only welds that might exist in the system depicted in FIGS. 3A-3C are welds that would secure the mounting clips 325 to the grid supports 30 (FIG. 2). However, such existing mounting clips 325 no longer require a cap strip 27 (FIG. 2) to secure the filter plate 304. As a result, this disclosure allows installers and servicers to drop in replacement filter plate assemblies 301 without being hindered by the overlain cap strips 27. As a result, it is contemplated that embodiments in accordance with this disclosure may reduce equipment downtime and production loss. Furthermore, by removing the cap strips 27, and by providing an engagement assembly 350 as described herein, it is contemplated that the exemplary embodiments described herein can minimize the welds in the overall drum surface and thereby significantly reduce the probability of partial system failure due to inconsistent weld work. Furthermore, if an owner elects to replace the mounting clips 325, the reduction in the overall number of welds facilitates faster replacement of these mounting clips 325 over what was previously possible.

An installer may practice a method for installing a replaceable filter plate assembly 301 comprising: ensuring that the engagers 352 are in an open position OP, lowering the replaceable filter plate assembly 301 along a radius of the drum 12, extending a first engager 352 disposed proximate to the leading end 332 toward the leading end 332 to define a first extended engager 352z1 in a first closed position CP1, extending a second engager 352 disposed proximate the trailing end 334 toward the trailing end 334 to define a second extended engager 352z2 in a second closed position CP2, and locking the first and second extended engagers 352z1, 352z2.

Figure 7A:
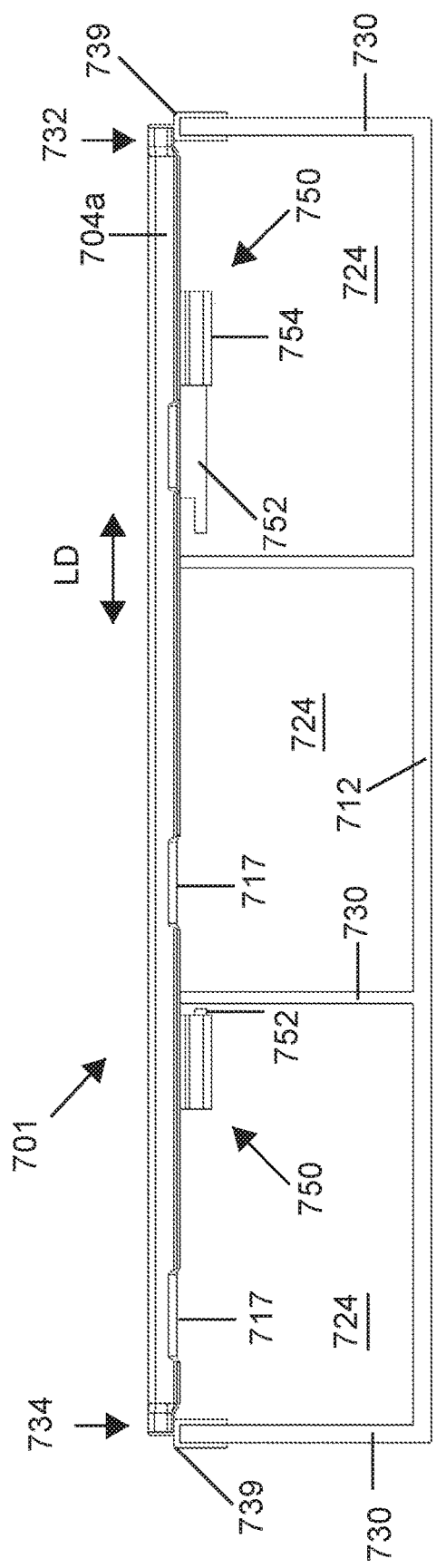
FIG. 7A is a side view of an exemplary "weld-less" engagement assembly in the open position.
Figure 7B:
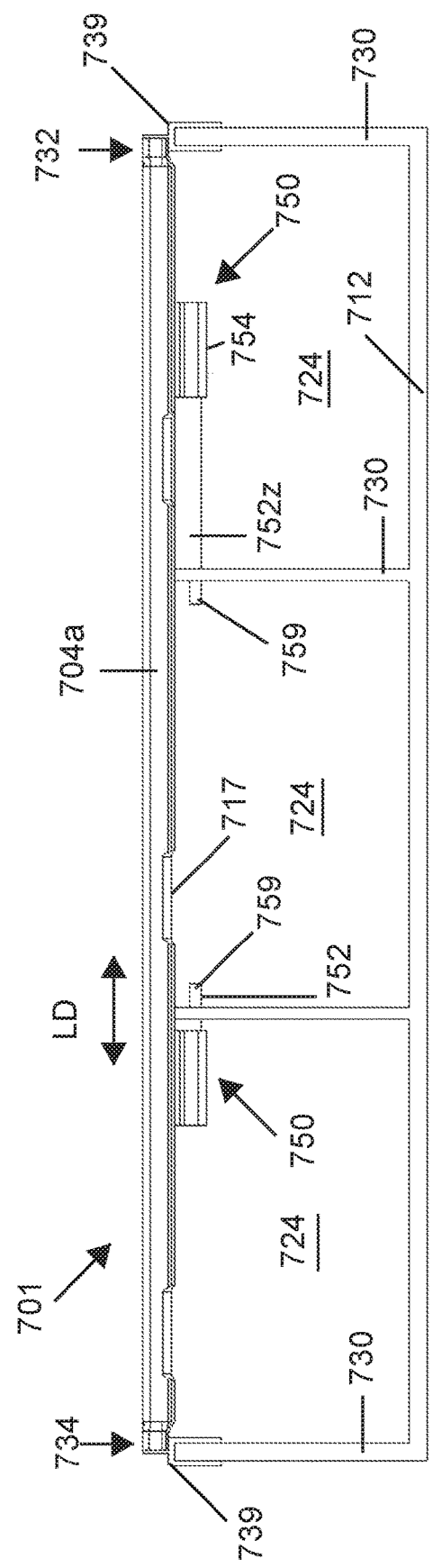
FIG. 7B is a side view of an exemplary "weld-less" engagement assembly in the closed position.

In other exemplary embodiments, the engager 352 may extend through the mounting clip 325. Although in such embodiments, a servicer would likely cut holes in the existing mounting clips 325 to accommodate the extended engager 352z. In still other exemplary embodiments, the mounting clips 325 are omitted and the engager 352 extends through the grid support 730 (FIGS. 7A and 7B).

In still other exemplary embodiments the engager 352 extends from the mounting clip 325 or the grid support (730, see FIG. 7) to engage the filter plate 304. In certain exemplary embodiments, the engager 352 extending from the mounting clip 325 or grid support 730 can engage a keyed out recess in the filter plate 304 configured to receive the engager 352. In other exemplary embodiments, the filter plate 304 can have areas defining a hole, wherein the hole is configured to receive the engagement end 359 of the engager 352 extending from the mounting clip 325 or grid support 730 toward the leading end 332 or trailing end 334 of the filter plate 304. In other exemplary embodiments, the engager extending from the mounting clip 325 or grid support 730 can be disposed on top of the filter plate 304 to thereby secure the filter plate 304 in place. Any engagement arrangement in which the engager 352 prevents the filter plate 304 from falling off of a mounting clip 325 or grid support 730 while the filter plate 304 rotates with the drum 12 during operation is considered to be within the scope of this disclosure. Any embodiment that is configured to allow filter plates 304 to be affixed to the adjacent mounting clips 325a, 325b by an engager that has a component of movement in the lateral direction and without welding the filter plate 304 to the mounting clips 325a, 325b is considered to be within the scope of this disclosure.

The engager 352 may be a latch (see FIGS. 4-6), a clamp, lever, bolt, wedge, clip, clasp, screw, and/or an insert, or a combination thereof. Any engager 352 configured to secure an end 332, 334 of the filter plate 304 to an adjacent mounting clip 325a, 325b or grid support 730 is considered to be within the scope of this disclosure. If the engager 352 is a latch, a wedge, or an insert, the engager 352 can slide laterally in the engager holder 354 to move toward and away from the axial bisection line BL in a lateral direction LD. In other exemplary embodiments, the engager 352 can pivot in the engager holder 354 (FIGS. 5A-5B and 6A-6C). A pivoting engager 352 will have rotational movement and is considered to be within the scope of this disclosure. It will be understood that rotational movement comprises components of lateral movement and components of axial movement (i.e. having a force vector parallel to the rotational axis A), and/or components of radial movement RD (FIG. 5A) (i.e. having a force vector extending radially outward from the rotational axis A toward the circumference C of the cylindrical drum 12). Likewise, exemplary engagers 352 may have a component of radial movement or axial movement relative to the lateral direction LD that is not rotational movement. As such, an engager configured to extend or retract in an axial direction, a radial direction, a lateral direction, a combination of an axial direction and a radial direction, a combination of an axial direction and a lateral direction, a combination of a radial direction and a lateral direction, or a combination thereof are considered to be within the scope of this disclosure.

The engagement assembly 350 fixedly engages the filter plate 304. In exemplary embodiments, the engagement assembly 350 may be riveted, bolted, fused, glued, clamped, or otherwise affixed to the filter plate 304. In still other exemplary embodiments, the engagement assembly 350 may be an integral part of the filter plate 304. As depicted, the filter plate 304 may be a corrugated filter plate 404a (FIG. 4A-4C).

Figure 4A:
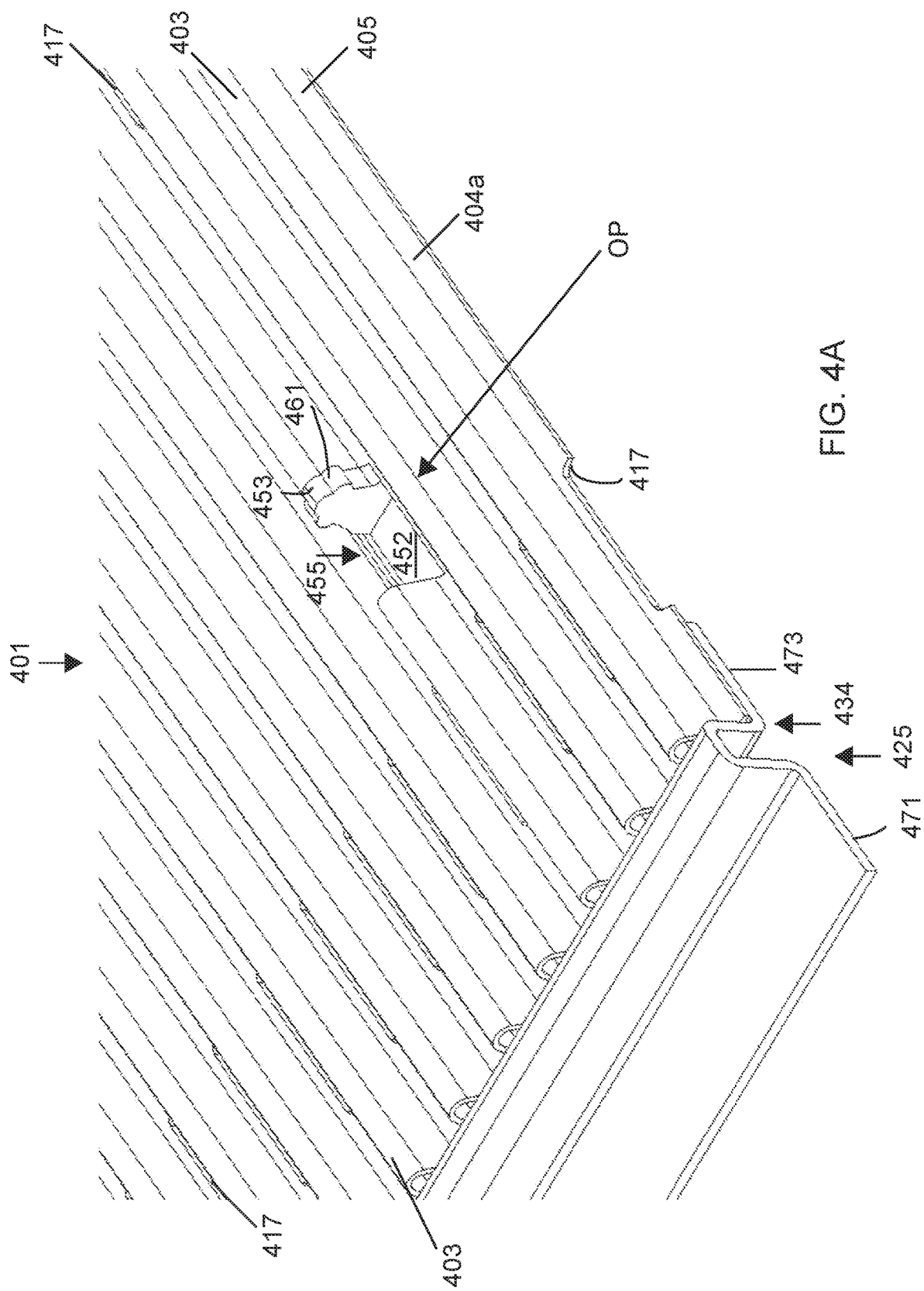
FIG. 4A is a perspective view of the trailing end of an exemplary removable filter plate assembly showing the top of the engagement assembly in the open position.

FIG. 4A is a detailed perspective view of the exemplary assembly shown in FIGS. 3A-3C. As FIG. 4A more clearly depicts, this exemplary embodiment of a replaceable filter plate assembly 401 for a rotary drum filter 10 comprises: a corrugated filter plate 404a having alternating ridges 403 and channels 405 disposed along the length L (FIG. 3A) of the corrugated filter plate 404a. The corrugated filter plate 404a has a leading end (see 332) distally disposed from a trailing end 434 and multiple drainage slots 417 defined by areas of the corrugated filter plate 404a and disposed along a width W and length L (see FIG. 3A) of the corrugated filter plate 404a. The multiple drainage slots 417 are preferably each disposed in the channels 405 of the corrugated filter plate 404a to drain filtrate 11 (FIG. 2) that accumulates in the channels 405. The corrugated filter plate 404a further comprises an engager slot 455 defined by areas of the corrugated filter plate 405. Areas of a ridge 403 preferably define the engager slot 455. An engager slot 455 in the ridge 403 minimizes the interactions of filtrate 11 (FIG. 2) with the engagement assembly 450 (FIG. 4B) and the engager 452.

Figure 4B:
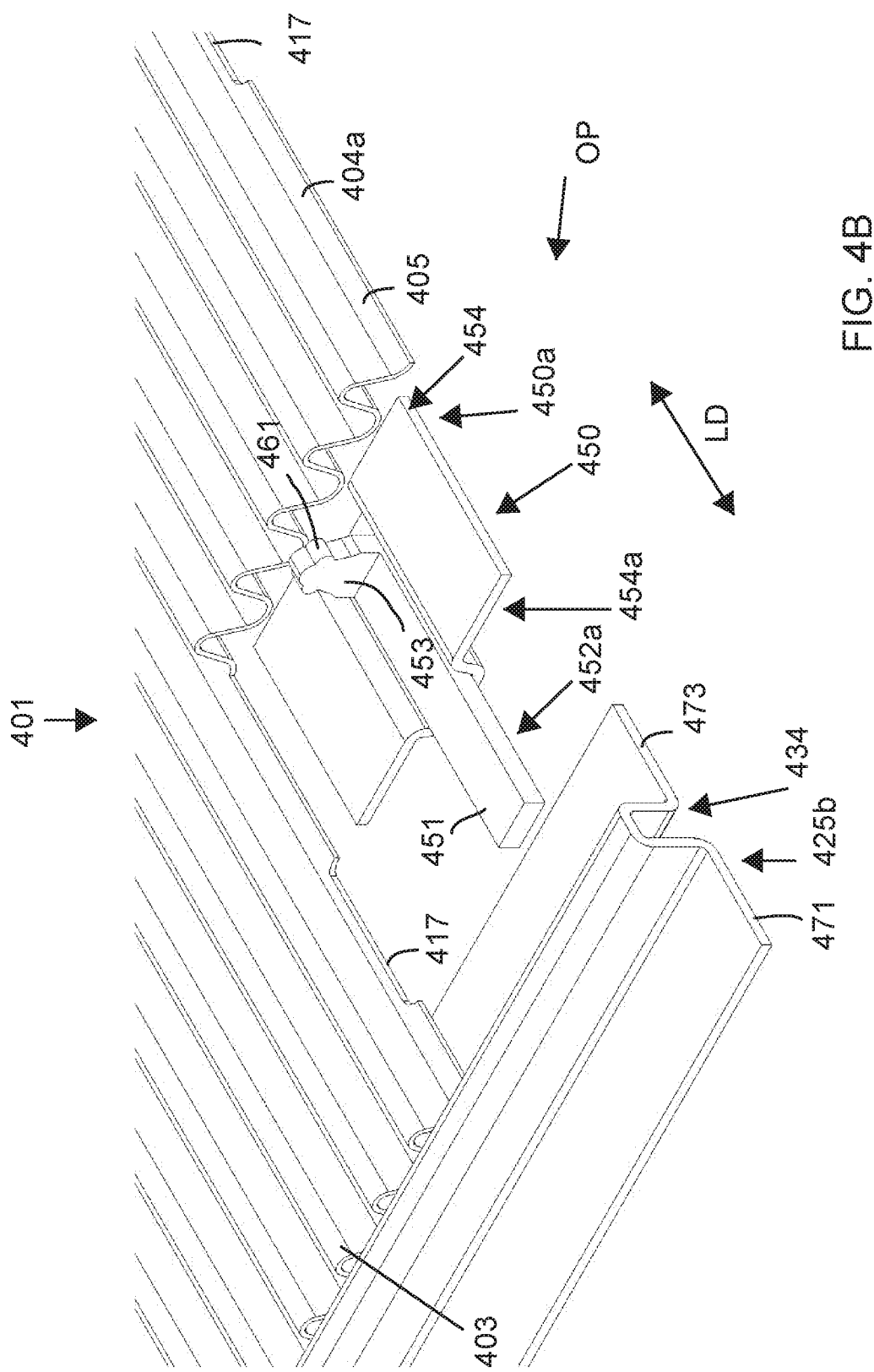
FIG. 4B is a detailed perspective view of the trailing end of an exemplary removable filter plate assembly with a portion of the filter plate removed to better show the exemplary engagement assembly in the open position. In this exemplary embodiment, the engagement assembly is a latch assembly.
Figure 4C:
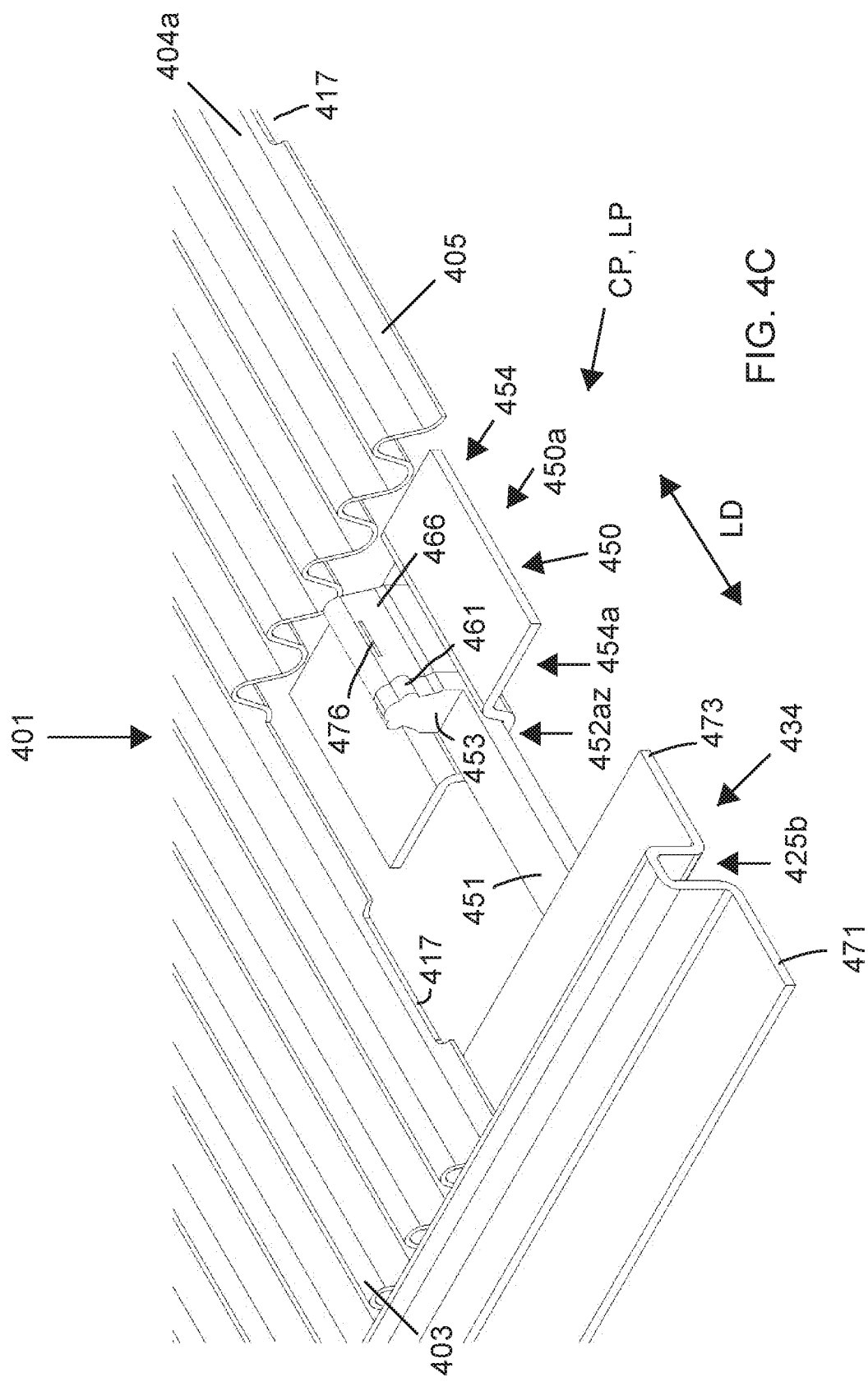
FIG. 4C is a detailed perspective view of the trailing end of an exemplary removable filter plate assembly with a portion of the filter plate removed to better show the exemplary latch assembly of FIGS. 4A and 4B in the locked position.
Figure 4D:
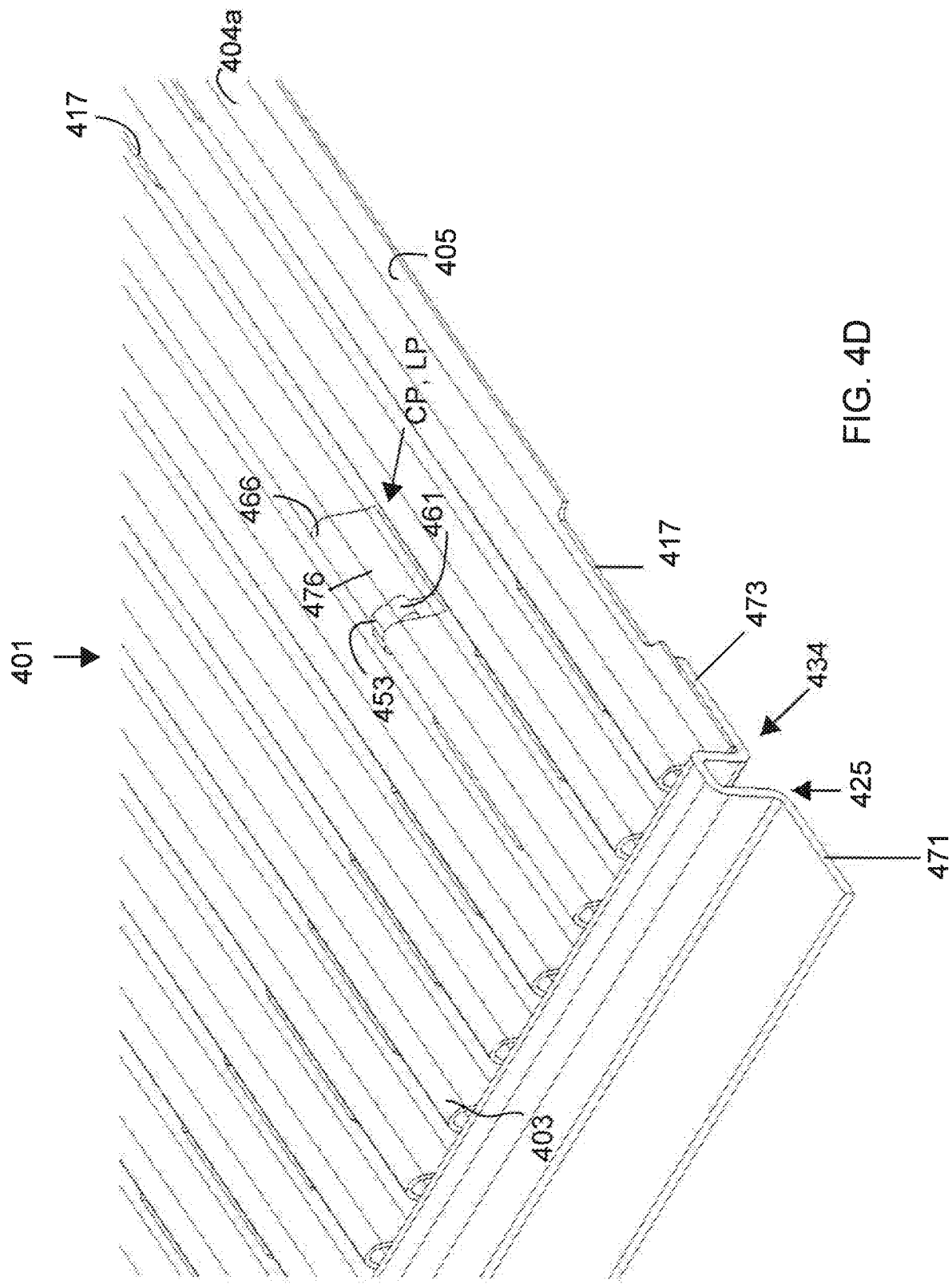
FIG. 4D is a perspective view of the trailing end of an exemplary removable filter plate assembly showing the top of the latch assembly of FIGS. 4A-4C in the locked position.

FIG. 4B has a portion of the corrugated filter plate 404a cut away to depict the engagement assembly 450 more clearly. In the depicted embodiment, the engagement assembly 450 is a latch assembly 450a comprising: a latch 452a. The latch 452a in turn comprises an elongate leg 451 and a handle 453. The handle 453 extends through the engager slot 455 (FIG. 4A). The latch assembly 450a further comprises a latch guide 454a, a type of engager holder 454. The latch 452a is disposed in the latch guide 454a and is configured to slide laterally along the latch guide 454a (i.e. in a lateral direction LD). The latch guide 454a engages the corrugated filter plate 404a. When installed, a first mounting clip 325a sits adjacently to the first end (see 332) of the corrugated filter plate 404a. A second mounting clip 425b sits adjacently to the second end 434 in the installed position.

The handle 453 desirably has a handle profile that conforms to the profile of the ridge 403 in which the handle 453 sits. When closed (FIG. 4C, 4D), the matching profiles allow filtrate 11 to flow unhindered into the adjacent channels 405, thereby minimizing the disruption to filtrate flow through the corrugated filter plate 404a. The handle 453 may have ears 461 protruding from the handle 453. In practice, a servicer may use a hammer or other blunt instrument to slide a latch in a closed position CP (FIG. 4C, 4D) back into the open position OP. In other exemplary embodiments, the ears 461 may be omitted.

FIG. 4C depicts the exemplary latch assembly 450a in the closed position CP and the locked position LP. In the depicted embodiment, the elongate latch leg 451 has been extended toward the trailing end 434 of the corrugated filter plate 404a and rests under the second shelf 473 of the adjacent top hat mounting clip 425. To lock the extended latch 452az in the closed position CP to define a locked position LP, a plug 466 is provided. The plug 466 is inserted into the engager slot 455 (FIG. 4D) to block the engager slot 455. As such, the plug 466 preferably has the same profile as the adjacent ridge 403 and the same dimensions as the engager slot 455 minus the width of the handle 453. The plug 466 is preferably made of heat-treated rubber, plastics, or other material configured to endure the operating environment of the particular process the for which the rotary drum filter 10 is configured. The plug 446 may further comprise a key slot 476. The key slot 476 leads to a locking mechanism configured to lock the plug 466 into place. A servicer may unlock the plug 466 by inserting the proper key (not depicted) into the key slot 476. In other exemplary embodiments, the key slot and locking mechanism may be in the handle 453.

Figure 5A:
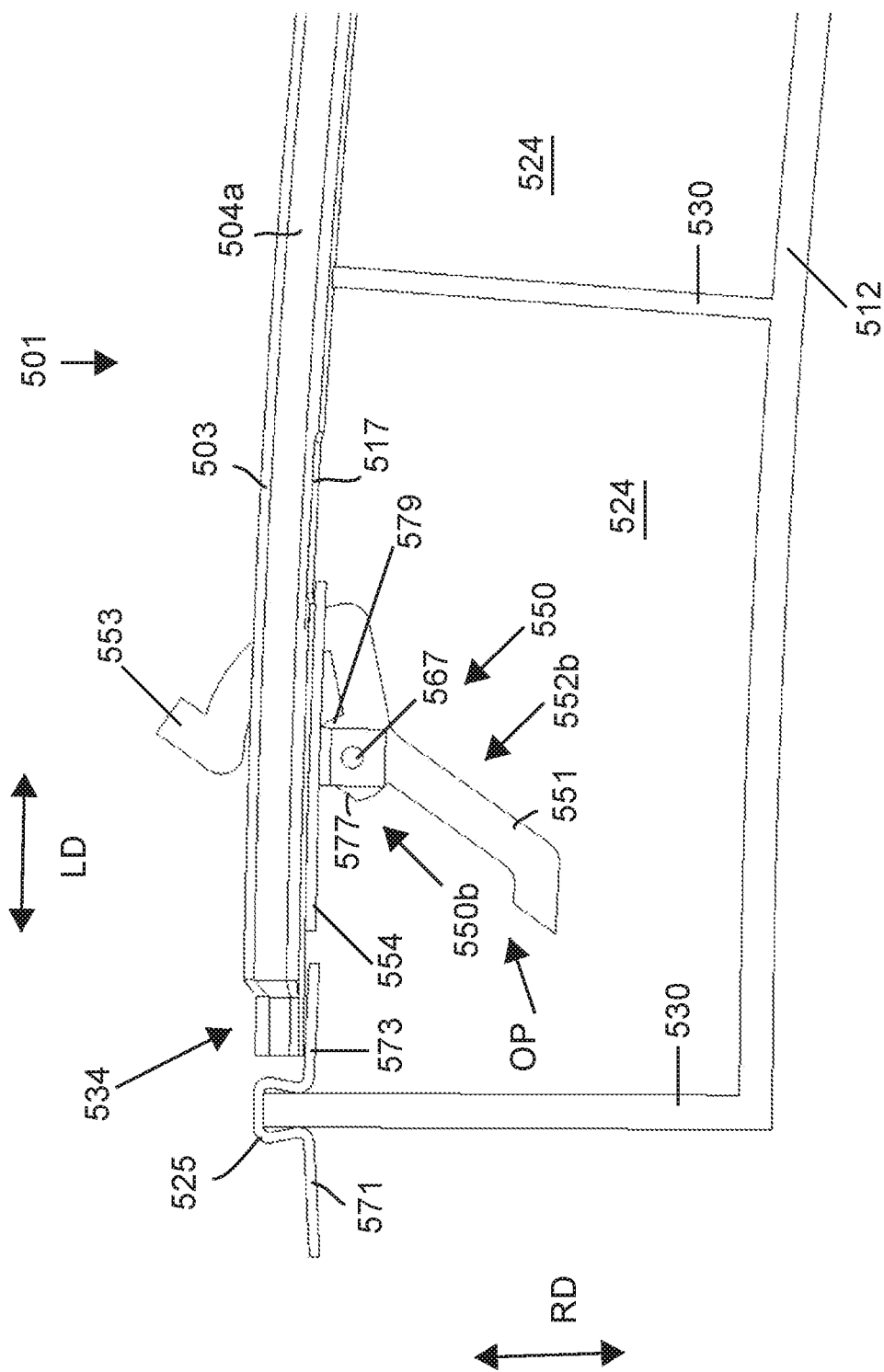
FIG. 5A is a side view of the open position of another exemplary embodiment comprising a cam latch.
Figure 5B:
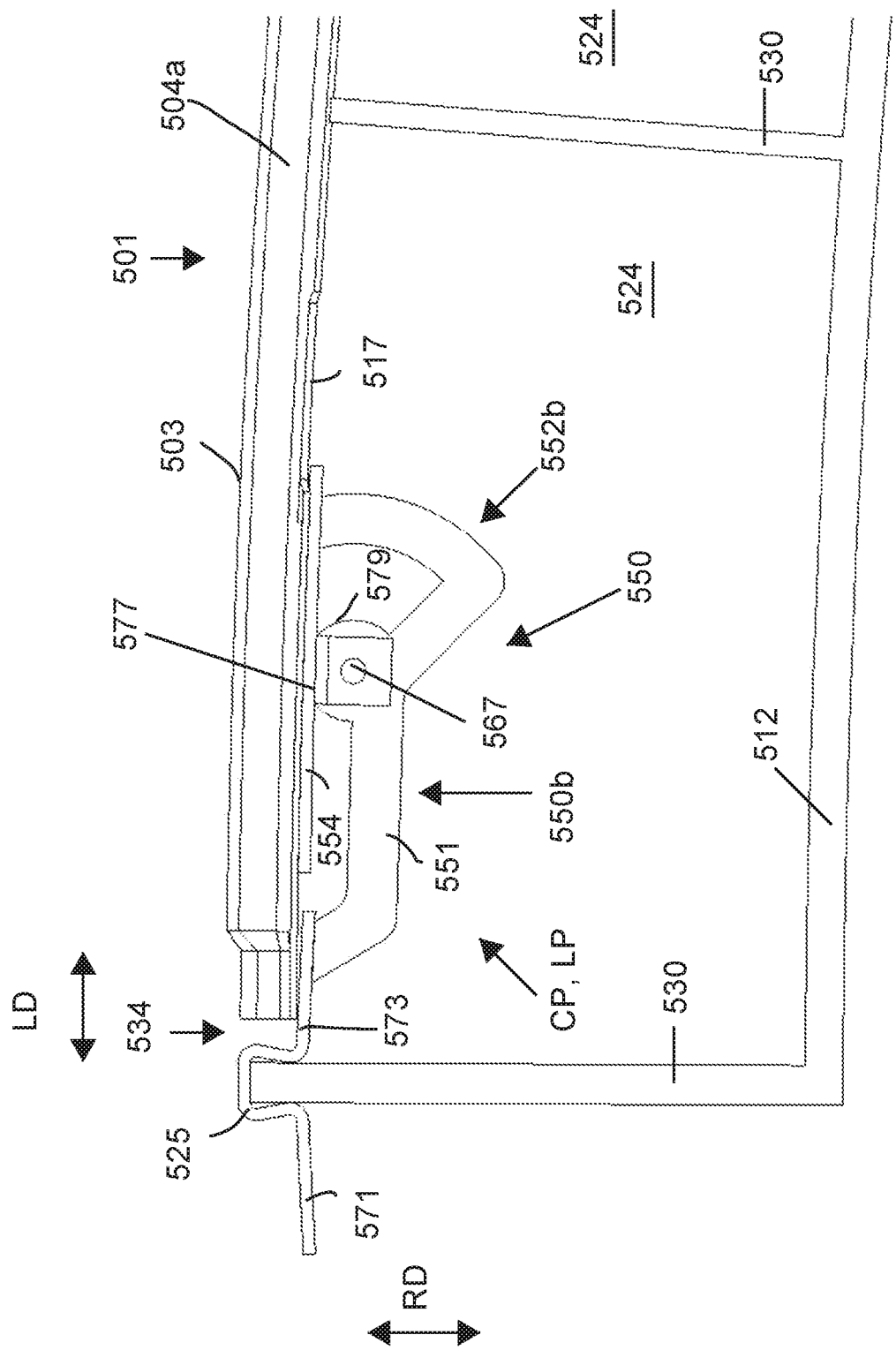
FIG. 5B is a side view of the closed position of another exemplary embodiment comprising a cam latch.

FIG. 5A shows a side view of another exemplary embodiment, wherein the engager 552 is a lever engager 552b in the open position OP. Likewise, the engagement assembly 550 is a lever engagement assembly 550b. The lever engager 552b comprises a cam 579 and a flat section 577. As an installer pushes the handle 553 toward the filter plate 504, the lever engager 552b rotates around the pivot 567 and the cam 579 moves against the engager retainer 554. In this manner, the force needed to push the handle 553 increases until the cam 579 rotates to the flat section 577. At this point, the force drops off and the flat section 577 sits flush against the bottom of the engager retainer 554 and the elongate leg 551 of the lever engager 552b presses under the second shelf 573 of the mounting clip 525 (FIG. 5B). The handle 553 likewise preferably sits flush in a ridge 503 of a corrugated filter plate 504a. In this manner, the lever engager 552b fixedly engages the exemplary filter plate assembly 501 to the drum 512.

To open the cam lever engager 552b again, an installer or servicer would overcome the maximum resting force of the closed lever engager 552b. In this manner, the cam 579 would rotate off the flat section 577 onto the rounded portion (i.e. the portion that contacts the bottom of the engager retainer 544). As such, unlike the embodiments depicted in FIGS. 4A-4D and 6A-6D, the closed position CP of the depicted cam lever engager 552b is also the locked position LP.

Figure 6A:
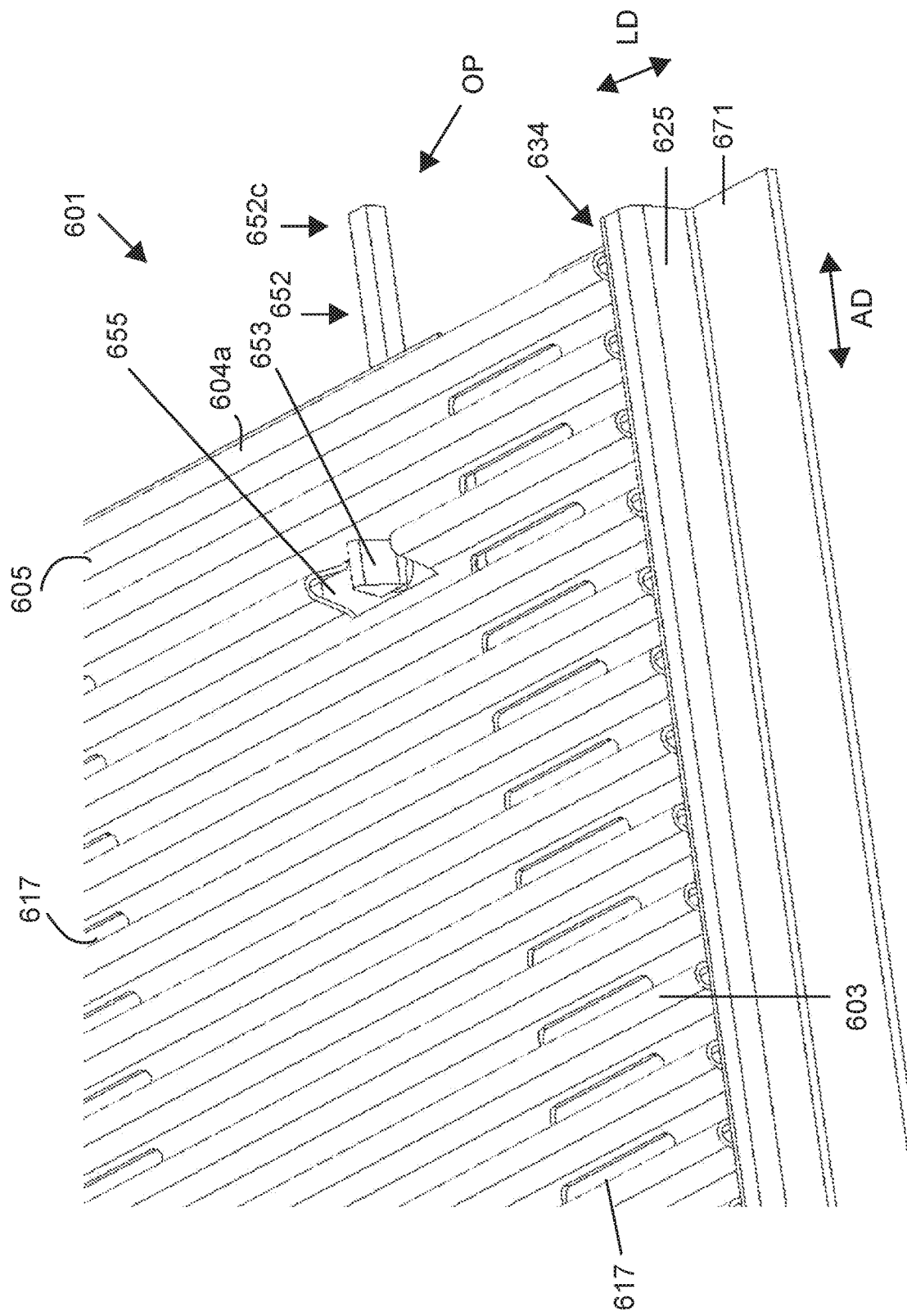
FIG. 6A is a perspective view of the trailing end of an exemplary removable filter plate assembly showing the top of the engagement assembly in the open position, wherein the engagement assembly comprises a laterally rotatable knob latch.

FIG. 6A is a perspective view of the trailing end 634 of an exemplary filter plate assembly 601, wherein the engager 652 is a knob latch 652c. In FIG. 6A, the knob latch 652c is in the open position OP. The handle 653 preferably has the same profile as a corrugation of the corrugated filter plate 604a to minimize obstructions to the filtrate flow. An installer or servicer may access the handle 653 through the knob slot 655 in the corrugated filter plate 604a. FIG. 6A also better illustrates the slots 617 in the channels 605 of the corrugated filter plate 604a.

Figure 6B:
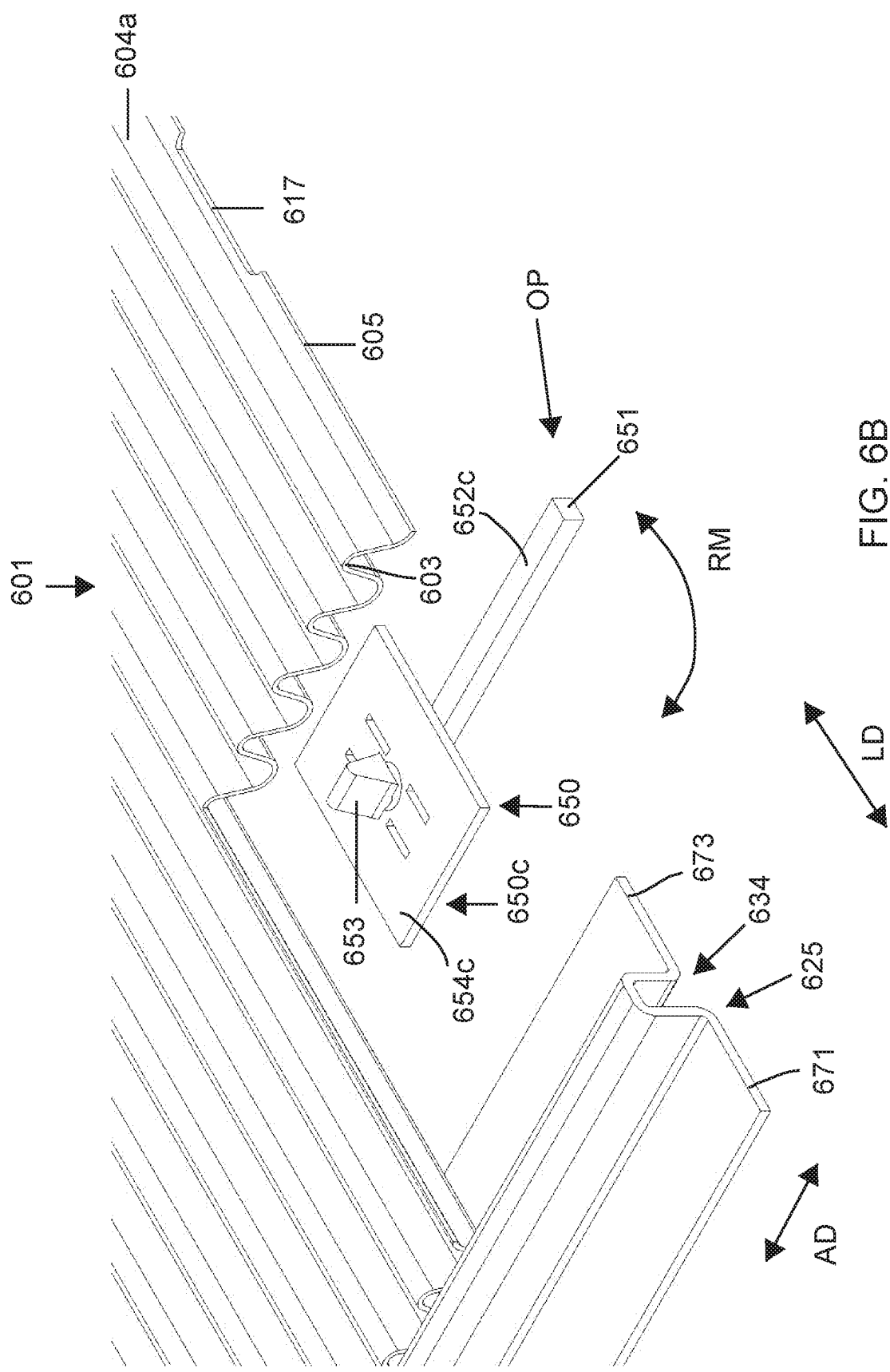
FIG. 6B is a detailed perspective view of the trailing end of an exemplary removable filter plate assembly with a portion of the filter plate removed to better show the exemplary knob latch assembly of FIG. 6A in the open position.

In FIG. 6B, a portion of the corrugated filter plate 604a has been removed to better illustrate the engagement assembly 650. In the depicted embodiment, the engagement assembly 650 is a knob latch engagement assembly 650c. Similar to the embodiment depicted in FIGS. 4A-4D, the knob latch engagement assembly 650c comprises a knob latch holder 654c that fixedly engages the bottom of the corrugated filter plate 604a. The knob latch 652c pivots in the knob latch holder 654c. The rotational movement RM of the knob latch 652c comprises vectors in a lateral direction LD and vectors in an axial direction AD.

Figure 6C:
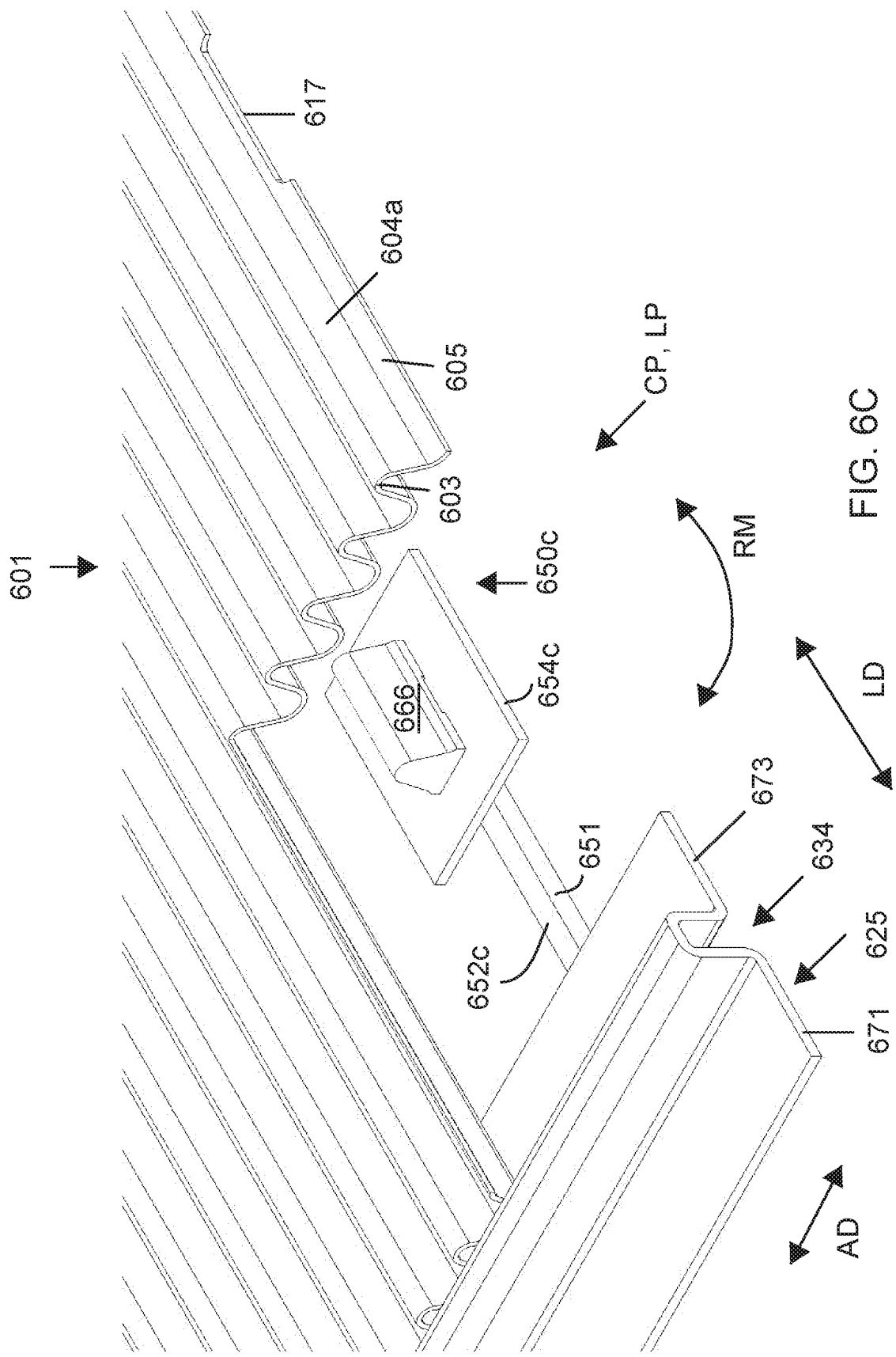
FIG. 6C is a detailed perspective view of the trailing end of an exemplary removable filter plate assembly with a portion of the filter plate removed to better show the exemplary knob latch assembly of FIGS. 6A and 4B in the locked position.
Figure 6D:
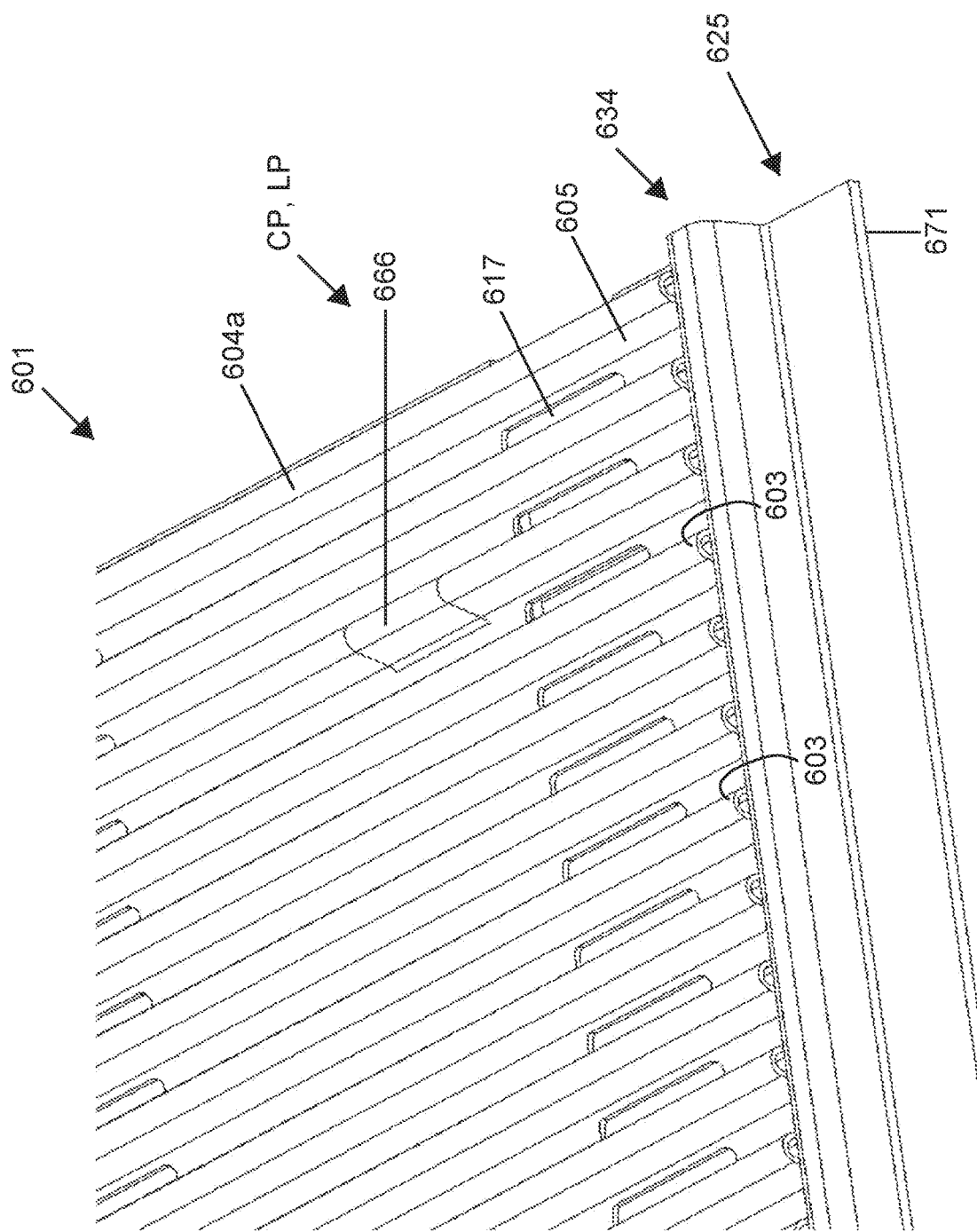
FIG. 6D is a perspective view of the trailing end of an exemplary removable filter plate assembly showing the top of the knob latch assembly of FIGS. 4A-4C in the locked position.

In FIG. 6C, an installer or servicer has turned the knob latch 652c a quarter turn to place the knob latch 652c under the adjacent mounting clip 625 to thereby engage the exemplary removable filter plate assembly 601 to the drum (see 512). A plug 666 has been placed over the handle 653 to lock the handle 653 and by extension, the knob latch 652c. By securing an end of the elongate leg 651 of the knob latch 652c under the mounting clip 625, the knob latch 652c prevents the filter plate assembly 601 from falling into the vat when the filter plate assembly 601 is below the horizontal plane that bisects the drum (see FIG. 1, 12). It will be appreciated that in other exemplary embodiments, the knob latch 652c may turn more than a quarter turn or less than a quarter turn. FIG. 6D shows the plug 666 securing the knob latch 652c in the locked position LP. The plug 666 has the same profile as the corrugation in which the plug 666 sits.

Although FIGS. 4-6 depict the engagement assembly 450, 550, and 650 disposed near the trailing end 434, 534, 634 of their respective filter plates 404, 504, 604, it will be appreciated that engagement assemblies 450, 550, and 650 disposed near the leading end 432, 532, 632 function in substantially the same way as the engagement assemblies detailed in the descriptions of FIGS. 4-6.

FIGS. 7A-7B are side views of another exemplary embodiment that obviates the need for top hat mounting clips (see 625) and cap strips (see 27, FIG. 2). As such, no welds are needed to engage any portion of the exemplary removable weld-less filter deck assembly 701 to the drum 712. In embodiments where mounting clips 625 are present, the mounting clips 625 are typically welded to the tops of grid supports 730. Like spot welds or T.I.G. welds of the cap strip 27, the mounting clip welds corrode over time and create maintenance and accessibility problems for servicers. By making a hole in the adjacent grid supports 730 to receive the engager 752, exemplary removable weld-less filter plate assemblies 701 in accordance with this and related embodiments may bypass the need for welds altogether to secure the drop in removable filter plate assembly 701 to the drum 712 via the grid supports 730.

Instead of a mounting clip 625, operators may use a mounting support 739. Unlike a mounting clip 625, a mounting support 739 does not have an overhang that prevents the extended latch 752z from sliding out of position. Furthermore, the mounting support 739 need not necessarily be welded to the grid support 730; rather, the mounting support 739 may be clamped, glued with an adhesive, or otherwise affixed to the grip support 730 in a way that does not include welding. In certain exemplary applications, the mounting support 739 may be omitted.

In operation, the engager 752 extends through the hole in the grid support 730 to fixedly engage the exemplary filter deck assembly to the drum 712. The engagement end 759 of each engager 752 is preferably a notched engagement end 759a. The notched engagement ends 759a prevent the leading and trailing ends 732, 734 from sliding off the support grids 730.

This weld-less removable filter deck assembly 701 preferably has engagers 752 that engage grid supports 730 that are laterally inward of the leading end 732 and the trailing end 734 of the filter plate 704. This permits mounting supports 793 to replace top hap mounting clips (see 625) at the grid supports adjacent to the leading end 732 and the trailing end 734 without also fashioning a hole through the lower mounting support 792 to accommodate an extended engager 752z in a closed or locked position.

An exemplary rotary drum filter removable weld-less filter plate assembly 701 comprises: a filter plate 704 having a leading end 732 distally disposed from a trailing end 734, an engagement assembly 750 engaged to the filter plate 704, the engagement assembly 750 comprising: an engager 752, and an engager holder 754 supporting the engager 752, wherein the engager 753 is configured to move in an axial direction (see AD, FIG. 6A), a radial direction (see RD, FIG. 5A), a lateral direction LD, a combination of an axial direction AD and a radial direction RD, a combination of an axial direction AD and a lateral direction LD, a combination of a radial direction RD and a lateral direction LD, or a combination thereof, wherein the engager 752 extended toward a grid support 730 disposed below the filter plate 704 defines a closed position CP, and wherein the engager 752 retracted from the grid support 730 below the filter plate 704 defines an open position OP. In exemplary embodiments, the engager 752 extends into the grid support 730 disposed below the filer plate 704. The grid support 730 desirably has areas defining a cut-out that is configured to receive the engagement end 759 of the extended engager 752z. In other exemplary embodiments, the grid support 730 has areas defining a hole configured to receive the engagement end 759 of the extended engager 752z. In such embodiments, the engager 752 is configured to extend through the grid support 730. The engagement end 759 of each engager 752 can be a notched engagement end 759a. In certain exemplary embodiments, the engager 752 is configured to have rotational movement (see RM, FIG. 6B).

Although FIGS. 7A and 7B depict an engagement assembly 750, wherein the engager 750 is a latch 752a, it will be understood that other exemplary weld-less embodiments, may comprise a lever engager (see 552b) that extends laterally into a hole in an adjacent grid support (see also FIGS. 5A and 5B), a knob latch engager (see 652c) that extends into a hole in an adjacent grid support (see also FIGS. 6A-6D), clamp, bolt, wedge, clip, clasp, screw, an insert, or a mechanism combination thereof configured to extend in a lateral direction LD from the corrugated filter plate 704a to an adjacent grid support 730 to fixedly engaged the filter plate 704a to the grid support 730. In other exemplary embodiment, the engager may extend in an axial direction AD to fixedly engage the filter plate 704a to the grid support 730. In other exemplary embodiment, the engager may extend in a radial direction RD to fixedly engage the corrugated filter plate 704a to the grid support 730. Engagers 752 configured to move in combinations of these directions are considered to be within the scope of this disclosure.

Figure 8:
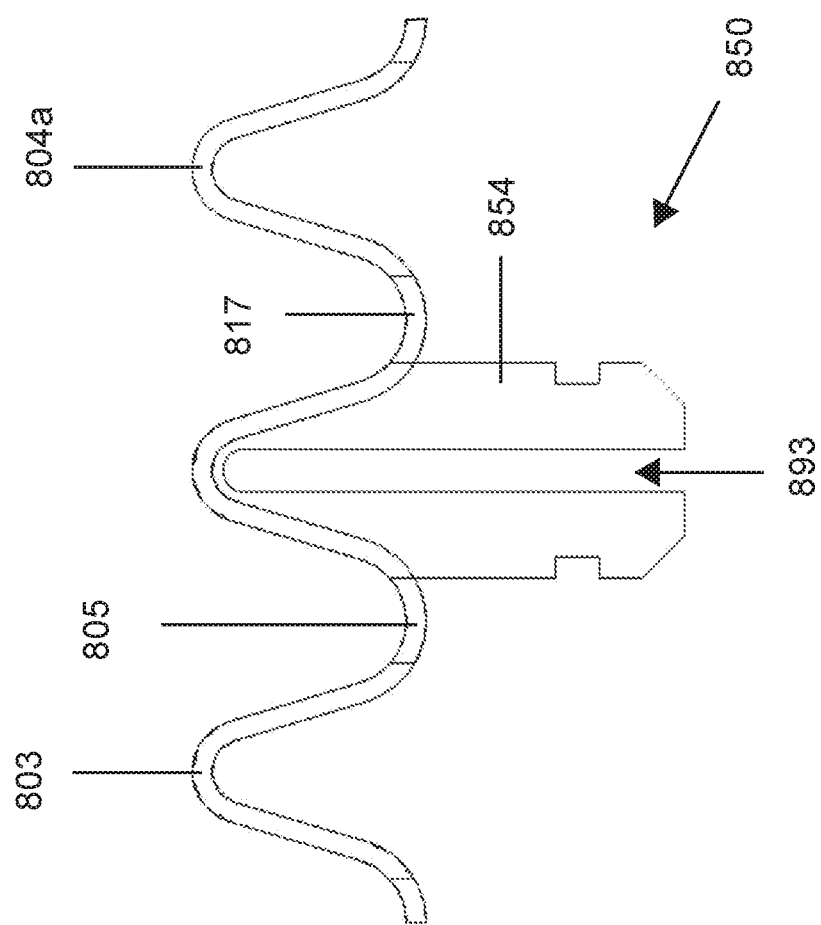
FIG. 8 is a cross-sectional view of an exemplary "weld-less" engagement assembly depicted in FIG. 7.

FIG. 8 is a cross-sectional view of an exemplary weld-less engagement assembly 850, wherein the engagement assembly 850 is engaged to the bottom of a corrugated filter plate filter plate 804a comprising a series of alternating channels 805 and ridges 803. The engager (752, FIG. 7A) extends through the gap 893 defined by the sides of the engager holder 854. The engagement assembly 850 may be riveted, bolted, fused, glued, or otherwise affixed to the corrugated filter plate 804a. In still other exemplary embodiments, the engagement assembly 850 may be an integral part of the corrugated filter plate 804a.

An exemplary rotary drum filter assembly comprises: a corrugated filter plate 704a, 804a comprising ridges 803 and channels 805, the corrugated filter plate 704a, 804a having a leading end 732 distally disposed from a trailing end 734, and multiple drainage slots 717 defined by areas of the corrugated filter plate 704a, 804a and disposed along a width W of the corrugated filter plate 704a, 804a, an engagement assembly 750, 850 comprising: an engager 752 and an engager holder 754, 854, wherein the engager 752 is disposed in the engager holder 754, 854 and is configured to move in an axial direction (see AD, FIG. 6A), a radial direction (see RD, FIG. 5A), a lateral direction LD, a combination of an axial direction AD and a radial direction RD, a combination of an axial direction AD and a lateral direction LD, a combination of a radial direction RD and a lateral direction LD, or a combination thereof, wherein the engager holder 754, 854 engages the corrugated filter plate 704a, 804a, wherein the engager 752 extended toward a grid support 730 disposed below the filter plate 704 defines a closed position CP, and wherein the engager 752 retracted from the grid support 730 below the filter plate 704 defines an open position OP.

An exemplary assembly for a rotary washer comprises: a filter plate having a leading end distally disposed from a trailing end, and an axial filter plate bisection line extending through the filter plate; and a latch assembly comprising: a latch, and a latch holder supporting the latch, wherein the latch is configured to extend in a lateral direction beyond the leading end or the trailing end of the filter plate, wherein an extended latch defines a closed position, and wherein the latch is configured to retract in the lateral direction toward the axial bisection line, and wherein a retracted latch defines an open position.

In further exemplary embodiments, the filter plate is a corrugated filter plate comprising ridges and channels, the corrugated filter plate having multiple drainage slots defined by areas of the corrugated filter plate and disposed along a width of the corrugated filter plate.

In still further exemplary embodiments, the removable filter plate assembly further comprises a engager slot defined by areas of a ridge in the corrugated filter plate, wherein the latch of the latch assembly further comprises an elongate leg and a handle, wherein the handle extends though the engager slot. In certain exemplary embodiments, the handle of the latch has a handle base profile, and wherein the handle base profile conforms to a ridge profile of the corrugated filter plate.

In still further exemplary embodiments, the handle of the latch further comprises ears extending from the handle base profile. In certain embodiments, the latch assembly further comprises a plug configured to be disposed in the engager slot to define a locked position. The plug may further comprise a key assembly. The plug may have a plug base profile that matches a ridge profile of the corrugated filter plate.

In certain exemplary embodiments, the latch of the latch assembly engages a first top hat mounting clip adjacently disposed to the leading end in the closed position. In further embodiments, the latch of the latch assembly engages a second top hat adjacently disposed to the trailing edge in the closed position. In still further exemplary embodiments, the first top hat and the second top hat lack cap strips. Further embodiments may comprise an L seal at the leading end.

In yet a further exemplary embodiments, a removable filter plate for a rotary washer comprises: a filter plate having a leading end distally disposed from a trailing end, an engagement assembly engaged to the filter plate, the engagement assembly comprising: an engager, and an engager holder supporting the engager, wherein the engager is configured to move in an axial direction, wherein the engager disposed at a first axial location define a closed position, and wherein the engager disposed at a second axial location defines an open position.

An exemplary rotary drum filter removable filter plate assembly comprises: a filter plate having a leading end distally disposed from a trailing end, and an axial filter plate bisection line extending through the filter plate; an engagement assembly engaged to the filter plate, the engagement assembly comprising: an engager, and an engager holder supporting the engager, wherein the engager is configured to extend in a lateral direction toward the leading end or the trailing end of the filter plate, wherein an extended engager defines a closed position, wherein the engager is configured to retract in the lateral direction toward the axial filter plate bisection line, and wherein a retracted engager defines an open position.

In certain exemplary embodiments, the engager is selected from the group consisting of: a latch, a lever, a cam lever, a knob latch, a clamp, a bolt, a wedge, a clip, a clasp, a screw, and an insert, or a combination thereof.

In certain exemplary embodiments, the adjacent mounting clip engages a radially distal end of a grid support.

In certain exemplary embodiments, the extended engager in the closed position extends under a first shelf of a mounting clip adjacent to the leading end of the filter plate, and wherein a plug seal is disposed between the first shelf of the mounting clip and the filter plate.

An exemplary rotary drum filter removable filter plate assembly comprises: a filter plate having a leading end distally disposed from a trailing end; an engagement assembly engaged to the filter plate, the engagement assembly comprising: an engager, and an engager holder supporting the engager, wherein the engager is configured to move in an axial direction, a radial direction, a lateral direction, a combination of an axial direction and a radial direction, a combination of an axial direction and a lateral direction, a combination of a radial direction and a lateral direction, or a combination thereof, wherein the engager extended toward an adjacent end of the filter plate defines a closed position, and wherein the engager retracted from the adjacent end of the filter plate defines an open position.

Another exemplary rotary drum filter removable filter plate assembly comprises: a filter plate having a leading end distally disposed from a trailing end; and an engagement assembly engaged to the filter plate, the engagement assembly comprising: an engager, wherein the engager is configured to move in an axial direction, a radial direction, a lateral direction, a combination of an axial direction and a radial direction, a combination of an axial direction and a lateral direction, a combination of a radial direction and a lateral direction, or a combination thereof, wherein the engager extended toward an adjacent end of the filter plate defines a closed position, and wherein the engager retracted from the adjacent end of the filter plate defines an open position.

In certain exemplary embodiments, the assembly further comprises an engager holder supporting the engager.

In certain exemplary embodiments, an adjacent mounting clip engages a radially distal end of a grid support, and wherein the extended engager extends toward the adjacent mounting clip.

In certain exemplary embodiments, the extended engager in the closed position extends under a first shelf of a mounting clip adjacent to the leading end of the filter plate, and wherein a plug seal is disposed between the first shelf of the mounting clip and the filter plate.

In certain exemplary embodiments, the filter plate is a corrugated filter plate comprising ridges and channels, the corrugated filter plate having multiple drainage slots defined by areas of the corrugated filter plate and disposed along a width of the corrugated filter plate.

Certain exemplary embodiments further comprise an engager slot defined by areas of a ridge in the corrugated filter plate, wherein the engager of the engagement assembly further comprises an elongate leg and a handle, wherein the handle extends though the engager slot.

In certain exemplary embodiments, the handle of the engager has a handle base profile, and wherein the handle base profile conforms to a ridge profile of the corrugated filter plate.

In certain exemplary embodiments, the handle of the engager further comprises ears extending from the handle base profile.

In certain exemplary embodiments, the handle of the engager further comprises a key and lock mechanism.

In certain exemplary embodiments, the engagement assembly further comprises a plug configured to be disposed in the engager slot to define a locked position.

In certain exemplary embodiments, the plug further comprises a key assembly.

In certain exemplary embodiments, the plug has a plug base profile that matches a ridge profile of the corrugated filter plate.

In certain exemplary embodiments, the engager of the engagement assembly engages a mounting clip adjacently disposed to the leading end in the closed position.

In certain exemplary embodiments, the engager of the engagement assembly engages a second mounting clip adjacently disposed to the trailing edge in the closed position.

In certain exemplary embodiments, the first mounting clip and the second mounting clip lack cap strips.

In certain exemplary embodiments, the engager is selected from the group consisting of: a latch, a lever, a cam lever, a knob latch, a clamp, a bolt, a wedge, a clip, a clasp, a screw, and an insert, or a combination thereof.

An exemplary rotary drum filter assembly comprises: a corrugated filter plate comprising ridges and channels, the corrugated filter plate having a leading end distally disposed from a trailing end, and multiple drainage slots defined by areas of the corrugated filter plate and disposed along a width of the corrugated filter plate; an engager slot defined by areas of the corrugated filter plate; an engagement assembly comprising: an engager comprising an elongate leg and a handle, wherein the handle extends through the engager slot, and an engager holder, wherein the engager is disposed in the engager holder and is configured to move in an axial direction, a radial direction, a lateral direction, a combination of an axial direction and a radial direction, a combination of an axial direction and a lateral direction, a combination of a radial direction and a lateral direction, or a combination thereof, wherein the engager holder engages the corrugated filter plate; a first mounting clip adjacently disposed to the leading end of the corrugated filter plate in an installed position; a second mounting clip adjacently disposed to the trailing end of the corrugated filter plate in the installed position, wherein the engager extended toward an adjacent end of the filter plate defines a closed position, and wherein the engager retracted from the adjacent end of the filter plate defines an open position.

In certain exemplary embodiments, the engager in the closed position extends under a first shelf of a mounting clip adjacent to the leading end of the filter plate, and wherein a plug seal is disposed between the first shelf of the mounting clip and the filter plate.

In certain exemplary embodiments, the engager is selected from the group consisting of: a latch, a lever, a cam lever, a knob latch, a clamp, a bolt, a wedge, a clip, a clasp, a screw, and an insert, or a combination thereof.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A rotary drum filter removable filter plate assembly comprising:
    a filter plate having a leading end distally disposed from a trailing end;
    an engagement assembly engaged to the filter plate, the engagement assembly comprising:
        an engager; and an engager holder supporting the engager, wherein the engager holder is attached to a bottom surface of the filter plate and the engager is configured to move in an axial direction, a radial direction, a lateral direction, a combination of an axial direction and a radial direction, a combination of an axial direction and a lateral direction, a combination of a radial direction and a lateral direction, or a combination thereof while supported by the engager holder, wherein in a closed position the engager is extended under a first shelf of a mounting clip and the leading end or the trailing end of the filter plate overlies the first shelf of the mounting clip.

2. The assembly of claim 1, wherein a plug seal is disposed between the first shelf of the mounting clip and the filter plate.

3. The assembly of claim 1, wherein the filter plate is a corrugated filter plate comprising ridges and channels, the corrugated filter plate having multiple drainage slots defined by apertures in the corrugated filter plate and disposed along a width of the corrugated filter plate.

4. The assembly of claim 3, further comprising an engager slot defined by areas of a ridge in the corrugated filter plate, wherein the engager of the engagement assembly further comprises an elongate leg and a handle, wherein the handle extends through the engager slot.

5. The assembly of claim 4, wherein the handle of the engager has a handle base profile, and wherein the handle base profile conforms to a ridge profile of the corrugated filter plate.

6. The assembly of claim 4, wherein the handle of the engager further comprises ears extending from a handle base profile.

7. The assembly of claim 4, wherein the handle of the engager further comprises a key and lock mechanism.

8. The assembly of claim 4, wherein the engagement assembly further comprises a plug configured to be disposed in the engager slot to define a locked position.

9. The assembly of claim 8, wherein the plug further comprises a key assembly.

10. The assembly of claim 8, wherein the plug has a plug base profile that matches a ridge profile of the corrugated filter plate.

11. The assembly of claim 1, wherein the mounting clip is adjacently disposed to the leading end of the filter plate in an installed position and a second mounting clip is adjacently disposed to the trailing end of the filter plate in the installed position.

12. The assembly of claim 1, wherein the engager is selected from the group consisting of: a latch, a lever, a cam lever, a knob latch, a clamp, a bolt, a wedge, a clip, a clasp, a screw, and an insert, or a combination thereof.

* * * * *